United States Patent
Denzin et al.

(10) Patent No.: US 10,851,532 B2
(45) Date of Patent: *Dec. 1, 2020

(54) TOUCHLESS FLUSHING SYSTEMS AND METHODS

(71) Applicant: Kohler Co., Kohler, WI (US)

(72) Inventors: Peter W. Denzin, Glenbeulah, WI (US); Jeffrey C. Hildebrand, Sheboygan, WI (US); Brian D. Renzelman, Sheboygan, WI (US); Clayton C. Garrels, Sheboygan, WI (US); Joseph L. Stauber, Sheboygan Falls, WI (US); Eric M. Plate, Plymouth, WI (US)

(73) Assignee: Kohler Co., Kohler, WI (US)

(*) Notice: Subject to any disclaimer, the term of this patent is extended or adjusted under 35 U.S.C. 154(b) by 0 days.

This patent is subject to a terminal disclaimer.

(21) Appl. No.: 15/588,821

(22) Filed: May 8, 2017

(65) Prior Publication Data

US 2017/0241118 A1   Aug. 24, 2017

Related U.S. Application Data

(63) Continuation of application No. 14/070,288, filed on Nov. 1, 2013, now Pat. No. 9,657,471.
(Continued)

(51) Int. Cl.
*E03D 5/10* (2006.01)
*B23P 19/00* (2006.01)
*E03D 1/14* (2006.01)

(52) U.S. Cl.
CPC ............. *E03D 5/105* (2013.01); *B23P 19/00* (2013.01); *E03D 1/142* (2013.01); *Y10T 29/49826* (2015.01)

(58) Field of Classification Search
CPC .......... E03D 5/105; E03D 9/033; E03D 9/02; E03D 5/10
(Continued)

(56) References Cited

U.S. PATENT DOCUMENTS 4,370,763 A * 2/1983 Dolan ..................... E03D 9/038
4/227.2
4,839,039 A   6/1989 Parsons et al.
(Continued)

FOREIGN PATENT DOCUMENTS

CN   2217044   1/1996
CN   1269016   10/2000
(Continued)

OTHER PUBLICATIONS

Chinese Office Action and English Translation Issued in Application No. 201510569997.7 dated Oct. 18, 2016.
(Continued)

*Primary Examiner* — Janie M Loeppke
(74) *Attorney, Agent, or Firm* — Lempia Summerfield Katz LLC

(57) ABSTRACT

A touchless actuation system for a toilet includes a touchless sensor, a motor assembly, and a processing circuit. The touchless sensor is located within a closed reservoir of the toilet. The processing circuit is configured to receive a signal from the touchless sensor and to detect an object within a detection region based on the signal. The detection region is external to the closed reservoir. The processing circuit is configured to facilitate flushing of the toilet through interaction with the motor assembly when the object is detected.

20 Claims, 30 Drawing Sheets

Related U.S. Application Data

(60) Provisional application No. 61/761,623, filed on Feb. 6, 2013, provisional application No. 61/722,019, filed on Nov. 2, 2012.

(58) Field of Classification Search
USPC .............................................. 4/227.1–227.7
See application file for complete search history.

(56) References Cited

U.S. PATENT DOCUMENTS

| | | |
|---|---|---|
| 5,184,642 A | 2/1993 | Powell |
| 5,224,685 A | 7/1993 | Chiang et al. |
| 5,400,446 A | 3/1995 | Bloemer |
| 5,625,294 A | 4/1997 | Kawai et al. |
| 5,694,653 A | 12/1997 | Harald |
| 5,730,165 A | 3/1998 | Philipp |
| 6,052,841 A | 4/2000 | Mankin et al. |
| 6,250,601 B1 | 6/2001 | Kolar et al. |
| 6,279,173 B1* | 8/2001 | Denzin .................... E03D 9/05 4/213 |
| 6,499,152 B2* | 12/2002 | Johnson ................. E03D 5/105 137/110 |
| 6,618,864 B2* | 9/2003 | Veal ....................... A47K 13/10 4/313 |
| 6,643,853 B2 | 11/2003 | Wilson et al. |
| 6,731,209 B2 | 5/2004 | Wadlow et al. |
| 6,734,685 B2 | 5/2004 | Rudrich |
| 6,860,282 B2 | 3/2005 | Guler |
| 6,962,168 B2 | 11/2005 | McDaniel et al. |
| 6,978,490 B2 | 12/2005 | Wilson |
| 6,995,670 B2 | 2/2006 | Wadlow et al. |
| 7,015,704 B1 | 3/2006 | Lang |
| 7,032,256 B2 | 4/2006 | Contadini |
| 7,063,103 B2 | 6/2006 | Guler et al. |
| 7,078,911 B2 | 7/2006 | Cehelnik |
| 7,083,156 B2 | 8/2006 | Jost et al. |
| 7,107,631 B2 | 9/2006 | Lang et al. |
| 7,150,293 B2 | 12/2006 | Jonte |
| 7,174,577 B2 | 2/2007 | Jost et al. |
| 7,232,111 B2 | 6/2007 | McDaniel et al. |
| 7,239,047 B1 | 7/2007 | Maxwell et al. |
| 7,242,298 B2 | 7/2007 | Cehelnik |
| 7,464,418 B2 | 12/2008 | Seggio et al. |
| 7,537,023 B2 | 5/2009 | Marty et al. |
| 7,537,195 B2 | 5/2009 | McDaniel et al. |
| 7,549,436 B2 | 6/2009 | Parsons et al. |
| 7,624,757 B2 | 12/2009 | Schmitt |
| 7,627,909 B2 | 12/2009 | Esche |
| 7,631,372 B2 | 12/2009 | Marty et al. |
| 7,690,395 B2 | 4/2010 | Jonte et al. |
| 7,743,782 B2 | 6/2010 | Jost |
| 7,784,481 B2 | 8/2010 | Kunkel |
| 7,806,141 B2 | 10/2010 | Marty et al. |
| 7,844,299 B2 | 11/2010 | Atarashi et al. |
| 7,867,172 B1 | 1/2011 | Baruti et al. |
| 7,878,217 B2 | 2/2011 | Buechel et al. |
| 7,979,928 B2 | 7/2011 | Allen et al. |
| 7,997,301 B2 | 8/2011 | Marty et al. |
| 8,009,045 B2 | 8/2011 | Cehelnik |
| 8,028,355 B2 | 10/2011 | Reeder et al. |
| 8,037,551 B2 | 10/2011 | Wilson et al. |
| 8,070,128 B2 | 12/2011 | Snyder et al. |
| 8,089,473 B2 | 1/2012 | Koottungal |
| 8,118,240 B2 | 2/2012 | Rodenbeck et al. |
| 8,127,782 B2 | 3/2012 | Jonte et al. |
| 8,132,778 B2 | 3/2012 | Connors |
| 8,162,236 B2 | 4/2012 | Rodenbeck et al. |
| 8,234,724 B2 | 8/2012 | Wilson et al. |
| 8,243,040 B2 | 8/2012 | Koottungal |
| 8,296,875 B2 | 10/2012 | Loberger et al. |
| 8,572,772 B2* | 11/2013 | Wolf ....................... E03C 1/057 4/623 |
| 2005/0076425 A1 | 4/2005 | Contadini |
| 2005/0133754 A1 | 6/2005 | Parsons |
| 2006/0010591 A1 | 1/2006 | Bush |
| 2006/0145111 A1 | 7/2006 | Lang et al. |
| 2006/0244466 A1 | 11/2006 | Call et al. |
| 2008/0053532 A1 | 3/2008 | Miller et al. |
| 2008/0072369 A1* | 3/2008 | Funari ..................... E03D 5/105 4/313 |
| 2008/0087856 A1 | 4/2008 | Wilson |
| 2008/0109956 A1 | 5/2008 | Bayley et al. |
| 2008/0283785 A1 | 11/2008 | Kunkel |
| 2008/0289098 A1 | 11/2008 | Kunkel |
| 2009/0077730 A1 | 3/2009 | Funari |
| 2009/0113614 A1 | 5/2009 | Yuen |
| 2009/0288712 A1 | 11/2009 | Lang et al. |
| 2009/0293192 A1 | 12/2009 | Pons |
| 2010/0044604 A1 | 2/2010 | Burke et al. |
| 2010/0108165 A1 | 5/2010 | Rodenbeck et al. |
| 2010/0170570 A1 | 7/2010 | Rodenbeck et al. |
| 2010/0252759 A1 | 10/2010 | Guler et al. |
| 2010/0294641 A1 | 11/2010 | Kunkel |
| 2011/0017929 A1 | 1/2011 | Guler et al. |
| 2011/0114187 A1 | 5/2011 | Sawaski |
| 2011/0155251 A1 | 6/2011 | Jonte et al. |
| 2011/0155894 A1 | 6/2011 | Davidson et al. |
| 2011/0155932 A1 | 6/2011 | Jonte et al. |
| 2011/0155934 A1 | 6/2011 | Guler et al. |
| 2011/0209287 A1 | 9/2011 | Call et al. |
| 2011/0252555 A1 | 10/2011 | Seo et al. |
| 2011/0252556 A1 | 10/2011 | Park et al. |
| 2011/0253220 A1 | 10/2011 | Sawaski et al. |
| 2012/0055557 A1 | 3/2012 | Belz et al. |
| 2012/0204337 A1 | 8/2012 | Pohler |

FOREIGN PATENT DOCUMENTS

| | | |
|---|---|---|
| CN | 1350610 | 5/2002 |
| CN | 2515288 | 10/2002 |
| CN | 2651312 | 10/2004 |
| CN | 1560808 | 1/2005 |
| CN | 201195874 | 2/2009 |
| CN | 101548054 | 9/2009 |
| CN | 202235069 | 5/2012 |
| EP | 0 160 593 | 11/1985 |
| EP | 0783058 | 7/1997 |
| EP | 1 426 502 | 6/2004 |
| EP | 1 605 593 | 12/2005 |
| EP | 1 662 056 | 5/2006 |
| EP | 1 916 345 | 4/2008 |
| EP | 1 936 045 | 6/2008 |
| EP | 1 961 876 | 8/2008 |
| EP | 1 961 877 | 8/2008 |
| EP | 1 964 988 | 9/2008 |
| EP | 1 965 494 | 9/2008 |
| EP | 2 088 251 | 8/2009 |
| EP | 2 460 942 | 6/2012 |
| JP | H0725069 | 5/1995 |
| JP | 2004-116148 | 4/2004 |
| WO | WO-90/03716 | 4/1990 |
| WO | WO-98/41701 | 9/1998 |
| WO | WO99/04283 | 1/1999 |
| WO | WO-2006/042053 | 4/2006 |
| WO | WO-2007/118791 | 10/2007 |
| WO | WO-2008/024005 | 2/2008 |
| WO | WO-2009/095879 | 8/2009 |
| WO | WO-2009/124866 | 10/2009 |
| WO | WO-2009/147266 | 12/2009 |
| WO | WO-2012/123050 | 9/2012 |
| WO | WO-2012/125213 | 9/2012 |
| WO | WO2013/138483 | 9/2013 |

OTHER PUBLICATIONS

Chinese Office Action for CN Application No. 201310535615.X with English translation, dated Nov. 3, 2014, 14 pages.
International Search Report and Written Opinion dated Apr. 15, 2014 in Application No. PCT/US2013/068128.

(56) References Cited

OTHER PUBLICATIONS

Partial International Search Report Regarding Application No. PCT/US2013/068128 dated Jan. 17, 2014.

* cited by examiner

TOUCHLESS FLUSHING SYSTEMS AND METHODS

CROSS-REFERENCE TO RELATED PATENT APPLICATIONS

This application is Continuation of U.S. patent application Ser. No. 14/070,288 filed Nov. 1, 2013, which claims the benefit of U.S. Provisional Application No. 61/722,019, filed Nov. 2, 2012, and U.S. Provisional Application No. 61/761,623, filed Feb. 6, 2013, the entire disclosures of which are incorporated herein by reference.

SUMMARY

One embodiment of the present disclosure is a touchless actuation (i.e., touchless flush) system for a toilet. The system includes a touchless sensor, a motor assembly, and a processing circuit. The processing circuit may be configured to receive a signal from the touchless sensor and to detect an object within a detection region based on the signal from the sensor. The processing circuit may be further configured to activate the motor assembly when an object is detected. The motor assembly may be configured to actuate flushing of the toilet when activated by the processing circuit. Advantageously, the touchless actuation system may be completely concealed within a closed reservoir for the toilet with the touchless sensor lacking an optical path to the detection region.

In some embodiments, the touchless sensor is a projected capacitive sensor. The projected capacitive sensor may project an electromagnetic field through a surface of the closed reservoir, defining a detection region outside the reservoir. In some embodiments, the surface of the closed reservoir may be a lid of the reservoir. In such an example, the detection region may be defined above the lid of the reservoir. In other embodiments, the projected capacitive sensor may be located to project an electromagnetic field through a different surface of the closed reservoir (e.g., a side).

The processing circuit may be configured to detect the presence of an object (e.g., an electromagnetic field-absorbing object or an electrically conductive object) within the detection region and activate the motor assembly when said object is detected. The detected object may be a hand or forearm of a user and the user may actuate flushing of the toilet by moving his or her hand into the detection region without touching the toilet, the reservoir, or the actuation system. The processing circuit may be configured to monitor a time since the motor assembly has been activated and prevent reactivation of the motor assembly if the time is within a time threshold.

The touchless actuation system may further include a housing within which the sensor, the motor assembly, and the processing circuit are contained and a positioning bracket for adjustably attaching to the housing and positioning the actuation system within the reservoir. In some embodiments, the positioning bracket may adjust the position of the actuation system relative to an upper surface of the reservoir.

In some embodiments, the touchless actuation system further includes a wheel assembly coupled to the motor assembly and configured to rotate when the motor assembly is activated. The wheel assembly may connect to a chain attached to a flushing mechanism within the reservoir, and rotation of the wheel assembly may cause the chain to actuate the flushing mechanism. In some embodiments, the chain may be directly attached to a flush valve such as a flapper, a canister seal covering an outlet of the reservoir, or a valve ball.

In some embodiments, the processing circuit may detect when the wheel assembly has completed one full rotation and deactivate the motor assembly when one full rotation is detected. For example, the touchless actuation system may include a reed switch coupled to the processing circuit, and a magnet located at an edge of the wheel assembly may activate the reed switch when the wheel assembly has completed one full rotation. The processing circuit may employ a motor control topology that ensures repeatable positional control of the wheel assembly. For example, the processing circuit may be configured to actively break the motor assembly by shorting electrical leads of the motor assembly.

In some embodiments, the wheel assembly may be replaced with a rotatable lever or arm coupled to the motor assembly and configured to rotate when the motor assembly is activated. The lever or arm may connect to a chain attached to a flushing mechanism within the reservoir, and rotation of the lever or arm may cause the chain to actuate the flushing mechanism. In some embodiments, the chain may be directly attached to a flush valve such as a flapper, a canister seal covering an outlet of the reservoir, or a valve ball.

The touchless actuation system may further include a power supply coupled to the motor assembly, and the processing circuit may activate the motor assembly by providing the motor assembly with an electric current from the power supply. The processing circuit may be configured to monitor the electric current provided to the motor assembly or a torque exerted by the motor assembly and initiate one or more safety precautions if the current exceeds a current threshold or the torque exceeds a torque threshold. The safety precautions may include deactivating the motor assembly, limiting the electric current provided to the motor assembly, limiting the torque exerted by the motor assembly, and activating a warning indicator. In some embodiments, the power supply may include one or more batteries, and the processing circuit may activate a warning indicator (e.g., provided by a small speaker, provided by an LED, etc.) when the batteries require replacement.

In some embodiments, the processing circuit may estimate a gesture performed by a user and initiate one or more supplemental actions based on the estimated gesture. The supplemental actions may include initiating a short flush, initiating a long flush, dispensing a deodorant, and initiating a cleaning process.

In some embodiments, the touchless actuation system may further include one or more additional touchless sensors and the processing circuit may be configured to distinguish between different gestures based on a plurality of signals received from the sensors. In some embodiments, the processing circuit may include a radio receiver. In addition to the touchless actuation driven by a capacitive sensor, the system may be configured to activate the motor assembly based on a radio signal received by the radio receiver.

Another implementation of the present disclosure is a touchless actuation system for a toilet including a first touchless sensor, a motor assembly, and a processing circuit. The first touchless sensor lacks an optical path to the detection region. The processing circuit is configured to receive a first signal from the first touchless sensor and to detect an object within a detection region based on the first signal. The processing circuit is further configured to activate the motor assembly upon detecting the object and the motor assembly is configured to actuate flushing of the toilet when activated by the processing circuit.

In some embodiments, the first touchless sensor is one of a projected capacitive sensor and a microwave sensor. In some embodiments, the actuation system is completely concealed within a closed reservoir for the toilet. In some embodiments, the first touchless sensor is electrically shorted to the motor assembly. In other embodiments, the first touchless sensor is electrically shorted to water contained within the toilet reservoir.

In some embodiments, the touchless actuation system further includes a second touchless sensor. In such embodiments, the processing circuit is further configured to receive a second signal from the second touchless sensor. The first and second signals include measurement values and time values. The processing circuit is further configured to determine whether the first measurement value exceeds a first threshold and whether the second measurement value exceeds a second threshold. The processing circuit compares a difference between the first time value and the second time value with a time threshold in response to the first measurement value exceeding the first threshold and the second measurement value exceeding the second threshold. Then, the processing circuit may determine whether an object is detected within the detection region based on the comparison.

In some embodiments, the actuation system is completely concealed within a closed toilet reservoir. The touchless sensor may be a projected capacitive sensor or a microwave sensor. The touchless sensor may be a projected capacitive sensor configured to project an electromagnetic field through a surface of a closed reservoir, wherein the electromagnetic field defines a detection region outside the reservoir. The surface of the closed reservoir may be a lid of the reservoir. The detection region may be defined above the lid of the reservoir.

In some embodiments, the processing circuit is configured to detect the presence of an object within the detection region and to activate the motor assembly when said object is detected. The object may be an electromagnetic field-absorbing object or an electrically conductive object. The object may also be a hand or forearm of a user. The user flushes the toilet by moving said hand or forearm into the detection region without touching the toilet, the reservoir, or the actuation system.

In some embodiments, the processing circuit is configured to monitor a time since the motor assembly has been activated and prevent reactivation of the motor assembly if the time is within a time threshold.

In some embodiments, a positioning bracket is configured to adjustably attach to the housing and position the actuation system within the reservoir. The positioning bracket is configured to adjust the position of the actuation system relative to an upper surface of the reservoir.

In some embodiments, a wheel assembly is coupled to the motor assembly and configured to rotate when the motor assembly is activated. The wheel assembly is configured to couple to a chain attached to a flushing mechanism within the reservoir, wherein rotation of the wheel assembly causes the chain to actuate the flushing mechanism. The chain may be directly attached to a flush valve covering an outlet of the reservoir. In some embodiments, the flush valve is a flapper or canister seal.

In some embodiments, the processing circuit is configured to detect when the wheel assembly has completed one full rotation and deactivate the motor assembly when one full rotation is detected. A reed switch may be coupled to the processing circuit, wherein a magnet in the wheel assembly activates the reed switch when the wheel assembly has completed one full rotation. The processing circuit may be configured to actively break the motor assembly when the reed switch is activated. Actively breaking the motor includes shorting electrical leads to the motor assembly. The processing circuit may be configured to bring the motor assembly to a desired rotational position, wherein the processing circuit uses a motor control topology to ensure repeatable positional control.

In some embodiments, a lever or arm is coupled to the motor assembly and rotates when the motor assembly is activated. The lever or arm may be configured to couple to a chain attached to a flushing mechanism within the reservoir, wherein rotation of the lever or arm causes the chain to actuate the flushing mechanism.

In some embodiments, a power supply is coupled to the motor assembly, wherein the processing circuit activates the motor assembly by providing the motor assembly with an electric current from the power supply. The processing circuit monitors the electric current provided to the motor assembly or a torque exerted by the motor assembly and initiates one or more safety precautions if the current exceeds a current threshold or the torque exceeds a torque threshold. The safety precautions may include deactivating the motor assembly, limiting the electric current provided to the motor assembly, limiting the torque exerted by the motor assembly, and/or activating a warning indicator. The power supply includes one or more batteries. The batteries may be "C" batteries, "AA" batteries, nine-volt batteries, twelve-volt batteries, or rechargeable batteries. The batteries may be a combination of those listed. In some embodiments, the processing circuit is configured to activate a warning indicator when the batteries require replacement.

In some embodiments, the processing circuit is configured to estimate a gesture performed by a user and initiate one or more supplemental actions based on the estimated gesture. The supplemental actions may include initiating a short flush, initiating a long flush, dispensing a deodorant, and initiating a cleaning process. In some embodiments, one or more additional touchless sensors may be used. The processing circuit estimates the gesture based on a plurality of signals received from the sensors. In some embodiments, the processing circuit includes a radio receiver and is configured to activate the motor assembly based on a radio signal received by the radio receiver.

In some embodiments, the touchless actuation system for a toilet includes a projected capacitive sensor, a motor assembly, and a processing circuit configured to receive a signal from the sensor and activate the motor assembly based on the signal. The motor assembly is configured to actuate flushing of the toilet when activated by the processing circuit. The actuation system is completely concealed behind an optically opaque surface. The projected capacitive sensor is configured to project an electromagnetic field through the opaque surface such that the electromagnetic field defines a detection region on a side of the surface opposite the sensor. The projected capacitive sensor is located within a closed reservoir for the toilet and lacks an optical path to the detection region.

In some embodiments, the touchless actuation system for a toilet includes a first touchless sensor, a motor assembly, and a processing circuit configured to receive a first signal from the first touchless sensor. The processing circuit detects an object within a detection region based on the first signal. The first touchless sensor lacks an optical path to the detection region. The processing circuit is configured to activate the motor assembly upon detecting the object, and the motor assembly is configured to actuate flushing of the toilet when activated by the processing circuit. The first touchless sensor may be a projected capacitive sensor or a microwave sensor. The first touchless sensor may be electrically shorted to the motor assembly. The first touchless sensor may be electrically shorted to water contained within a reservoir for the toilet. The actuation system is completely concealed within a closed reservoir for the toilet. The system also includes a second touchless sensor. The processing circuit is configured to receive a second signal from the second touchless sensor. The first signal includes a first measurement value and a first time value, and the second signal includes a second measurement value and a second time value. The processing circuit determines whether the first measurement value exceeds a first threshold and whether the second measurement value exceeds a second threshold. The processing circuit compares a difference between the first time value and the second time value with a time threshold in response to the first measurement value exceeding the first threshold and the second measurement value exceeding the second threshold. The processing circuit determines whether an object is detected within the detection region based on the comparison.

Another embodiment relates to a touchless actuation system for a toilet. The system includes a first touchless sensor, a motor assembly and a processing circuit. The processing circuit is configured to receive a first signal from the first touchless sensor and to detect an object within a detection region based on the first signal. The first touchless sensor lacks an optical path to the detection region. The processing circuit is configured to activate the motor assembly upon detecting the object and wherein the motor assembly is configured to actuate flushing of the toilet when activated by the processing circuit. The first touchless sensor is one of a projected capacitive sensor and a microwave sensor. The actuation system is completely concealed within a closed reservoir for the toilet. The first touchless sensor is electrically shorted to the motor assembly. The first touchless sensor is electrically shorted to water contained within a reservoir for the toilet. The system may further include a second touchless sensor. The processing circuit is configured to receive a second signal from the second touchless sensor. The first signal includes a first measurement value and a first time value. The second signal includes a second measurement value and a second time value. The processing circuit is further configured to determine whether the first measurement value exceeds a first threshold and whether the second measurement value exceeds a second threshold. The processing circuit is also configured to compare a difference between the first time value and the second time value with a time threshold in response to the first measurement value exceeding the first threshold and the second measurement value exceeding the second threshold. The processing circuit is also configured to determine whether an object is detected within the detection region based on the comparison.

The foregoing is a summary and thus by necessity contains simplifications, generalizations, and omissions of detail. Consequently, those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Figure 1A:
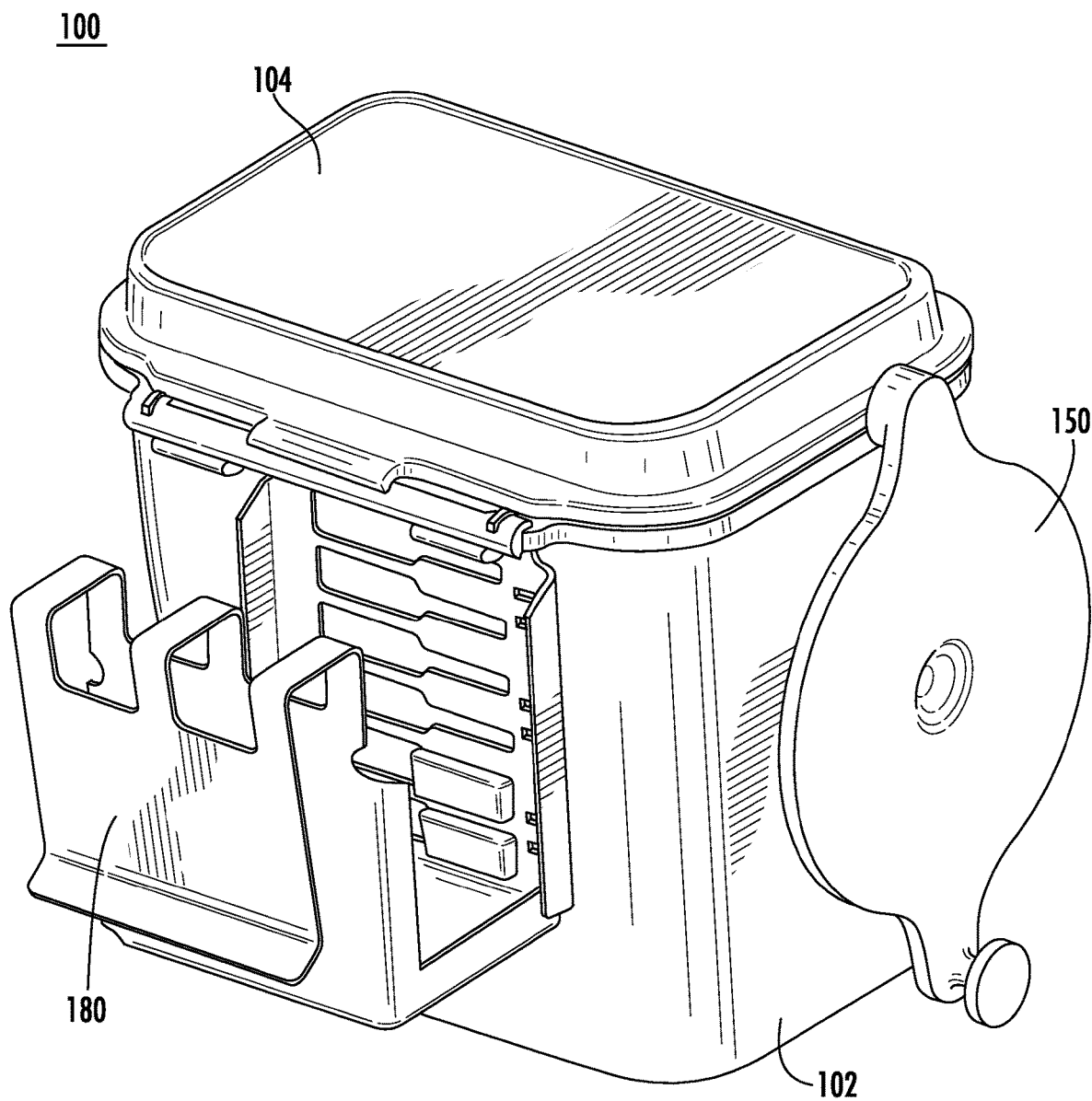
FIG. 1A is a drawing illustrating a perspective view of a touchless actuation system contained within a housing including a cover and a positioning bracket, according to an exemplary embodiment.

Before discussing further details of the touchless actuation system and/or the components thereof, it should be noted that references to "front," "back," "rear," "upward," "downward," "inner," "outer," "right," and "left" in this description are merely used to identify the various elements as they are oriented in the FIGURES. These terms are not meant to limit the element which they describe, as the various elements may be oriented differently in various applications.

It should further be noted that, for purposes of this disclosure, the term "coupled" means the joining of two members directly or indirectly to one another. Such joining may be stationary in nature or moveable in nature and/or such joining may allow for the flow of fluids, electricity, electrical signals, or other types of signals or communication between the two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

Referring generally to the FIGURES, a touchless actuation system for a toilet is shown, according to various exemplary embodiments. The touchless actuation system may be contained within a protective housing and mounted within a closed toilet reservoir. The protective housing may encapsulate a touchless sensor, a motor assembly, and a power supply. The touchless sensor may be a projected capacitive sensor, a microwave sensor, an electromagnetic sensor, or another type of sensor capable of detecting an object without requiring an optical path (e.g., a line of sight) between the sensor and the object.

The touchless sensor may project an electromagnetic field or microwave emission through an optically opaque surface of the reservoir and into a detection region outside the reservoir. In some embodiments, the detection region may be above the reservoir lid. Upon detecting an object in the detection region, the touchless actuation system may activate the motor assembly, thereby causing a wheel assembly to rotate. The wheel assembly may be connected to a flush valve (e.g., a valve ball, "flapper" or canister-style valve) within the reservoir via a chain or other coupling link. Rotation of the wheel assembly may open the flush valve and result in actuation (e.g., flushing) of the toilet.

In some implementations, the touchless actuation system may be mounted within the reservoir via a positioning bracket. The positioning bracket may be configured to fit over an upper edge of a vertical reservoir surface (e.g., a front surface, a back surface, a side surface, etc.). The positioning bracket may attach to the housing for securing the touchless actuation system within the closed reservoir. The positioning bracket may be configured to attach to the housing at a variety of different locations for controlling the vertical position of the touchless sensor. For example, it may be advantageous to position the sensor as close as possible to the reservoir lid. The adaptability of the positioning bracket may facilitate implementation of the touchless actuation system in toilets having a variety of lid thicknesses.

After mounting the touchless actuation system within the reservoir, an optically opaque lid may be placed over the reservoir, thereby concealing the touchless actuation system from view. Advantageously, the touchless actuation system may be entirely contained within the closed reservoir. All components, including all moving components (e.g., the wheel assembly, the motor assembly), the power supply, and the touchless sensor, may be completely hidden from view. A user may flush the toilet by waving his or her hand over the reservoir lid. The touchless actuation system may detect the user's hand above the lid without requiring an optical path between the sensor and the detection region.

Referring now to FIG. 1A, a touchless actuation system 100 is shown, according to an exemplary embodiment. System 100 is shown to include a housing 102, a cover 104, a wheel assembly 150, and a positioning bracket 180. Housing 102 may be closed on one end by cover 104. Housing 102 and cover 104 may form an enclosure for system 100 and protect the electrical components of system 100 from external sources of damage or contamination (e.g., water damage, physical damage, chemical damage, etc.). In some embodiments, housing 102 and cover 104 may be water-resistant or waterproof, thereby facilitating the implementation of system 100 in a humid environment. For example, system 100 may be positioned within a toilet reservoir and/or submerged in water either partially or completely. Positioning bracket 180 may attach to housing 102 for securing system 100 within the reservoir and to a vertical reservoir surface. Wheel assembly 150 may link system 100 with a flush valve at the bottom of the reservoir. In some embodiments, a chain or other coupling device may attach to wheel assembly 150 and to the flush valve. Rotation of wheel assembly 150 may pull on the chain and open the flush valve, thereby actuating flushing of the toilet.

Figure 1B:
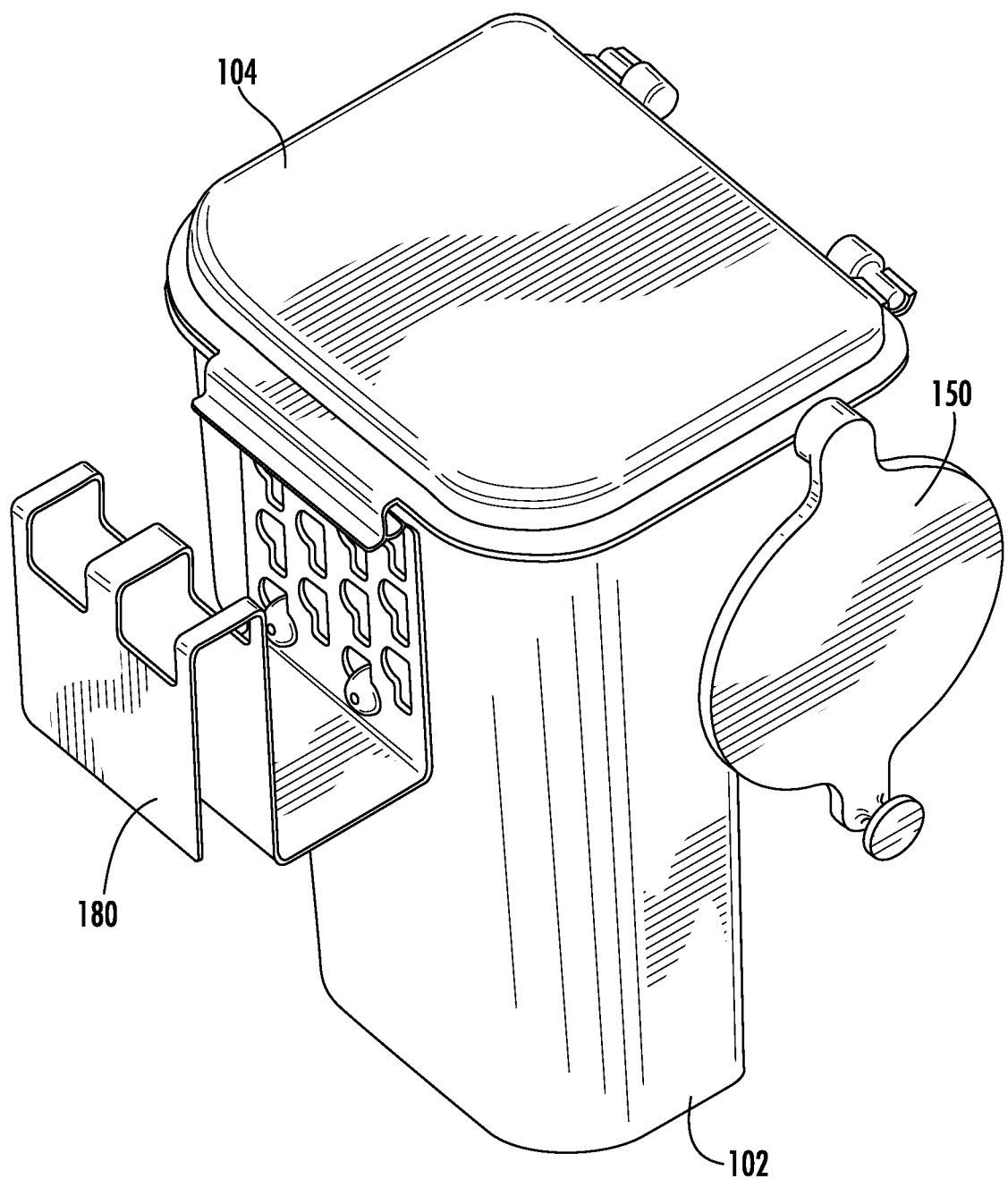
FIG. 1B shows an alternate embodiment of the touchless actuation system of FIG. 1A, according to an exemplary embodiment.

FIG. 1B shows an alternate embodiment of system 100. This embodiment illustrates that additional housing and bracket designs and/or shapes may be used with system 100. Housing 102 is elongated in comparison to the embodiment shown in FIG. 1A. The dimensions of housing 102 may be altered to accommodate design or aesthetic choices as illustrated in this embodiment. With reference to FIG. 1B, housing 102 has two circular pegs. Bracket 180 has slots configured to accept the circular pegs. The slots prevent rotation of housing 102 relative to bracket 180. The slots further allow housing 102 to be positioned at various heights relative to bracket 180.

Figure 2A:
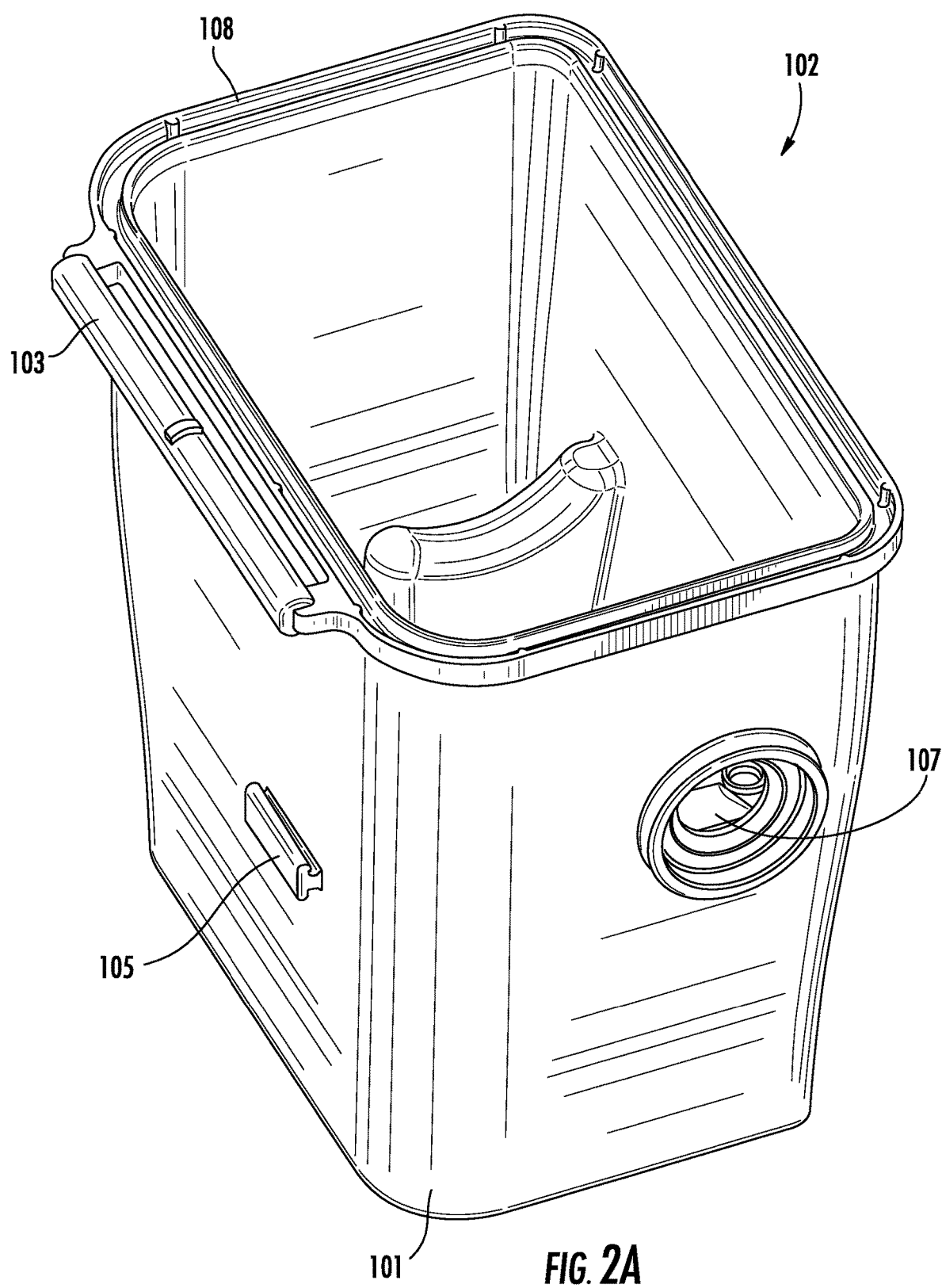
FIG. 2A is a drawing illustrating a perspective view of the housing in greater detail, according to an exemplary embodiment.

Referring now to FIG. 2A, housing 102 is shown in greater detail, according to an exemplary embodiment. Housing 102 is shown to include a shell 101, a cover axle 103, a positioning peg 105, a port 107, and a seal channel 108. Shell 101 may form an outer surface of housing 102 having an opening on one end thereof. In some embodiments, shell 101 may be made of a polymeric material such as acrylonitrile butadiene styrene (ABS), high density polyethylene (HDPE), or another polymeric or elastomeric material. In other embodiments, shell 101 may be made of metals, ceramics, or any other suitable material. Shell 101 may contain at least some of the electrical or mechanical components of system 100 and protect such components from external sources of damage or contamination.

Cover axle 103 may provide an axial link between housing 102 and cover 104. Cover axle 103 may define an axis about which cover 104 rotates between an open position and a closed position. In some embodiments, cover axle 103 may be a rod or bar offset from an upper edge of shell 101. Cover axle 103 may extend longitudinally between a first end and a second end, each of which may be attached to shell 101. In other embodiments, cover axle 103 may be a hinge, pivot joint, or other type of bearing providing a rotatable linkage between housing 102 and cover 104.

Peg 105 is shown as a horizontal extrusion, extending outward from a side surface of shell 101. Peg 105 may be configured to fit into a corresponding slot in positioning bracket 180 for attaching housing 102 to positioning bracket 180. In some embodiments, peg 105 may prevent housing 102 from rotating relative to positioning bracket 180. For example, peg 105 may be a slender rectangular extrusion configured to fit into a rectangular slot in positioning bracket 180. The rectangularity of peg 105 may prevent the rotation of housing 102 relative to positioning bracket 180. In other embodiments, a plurality of pegs 105 may extend from shell 101. The plurality of pegs 105 may prevent rotation between housing 102 and positioning bracket 180 by linking such components in multiple locations. In some embodiments, peg 105 may fit into one of several available slots located at various heights along positioning bracket 180. By selecting a particular slot into which peg 105 is inserted, one can adjust the height of housing 102 relative to positioning bracket 180. This adjustability may facilitate the installation of system 100 at various heights inside a toilet reservoir and provide improved sensing potential.

Still referring to FIG. 2A, housing 102 is shown to include a port 107. Port 107 may be a hole, bore, slot, channel, or other opening through which a solid object may extend. In an exemplary embodiment, port 107 may allow a physical, mechanical, or other connection between a motor assembly contained within housing 102 and an actuation mechanism external to housing 102 (e.g., a traditional "flapper," a canister-style seal, valve ball, etc.). For example, a shaft or axle may extend through port 107 and connect the motor assembly within housing 102 to wheel assembly 150. Activating the motor assembly may cause wheel assembly 150 to rotate, thereby triggering the actuation mechanism. Port 107 may include a seal, a bearing, or other intermediate component to facilitate operation of the motor assembly and/or to protect system 100 from external sources of damage or contamination which may include water in the toilet reservoir.

In some embodiments, housing 102 further includes a seal channel 108 along an outer perimeter of the opening in shell 101. Seal channel 108 may be an indentation into which a perimeter seal may be inserted. The perimeter seal may provide a water-resistant or waterproof barrier between shell 101 and cover 104 when cover 104 is in the closed position.

Figure 2B:
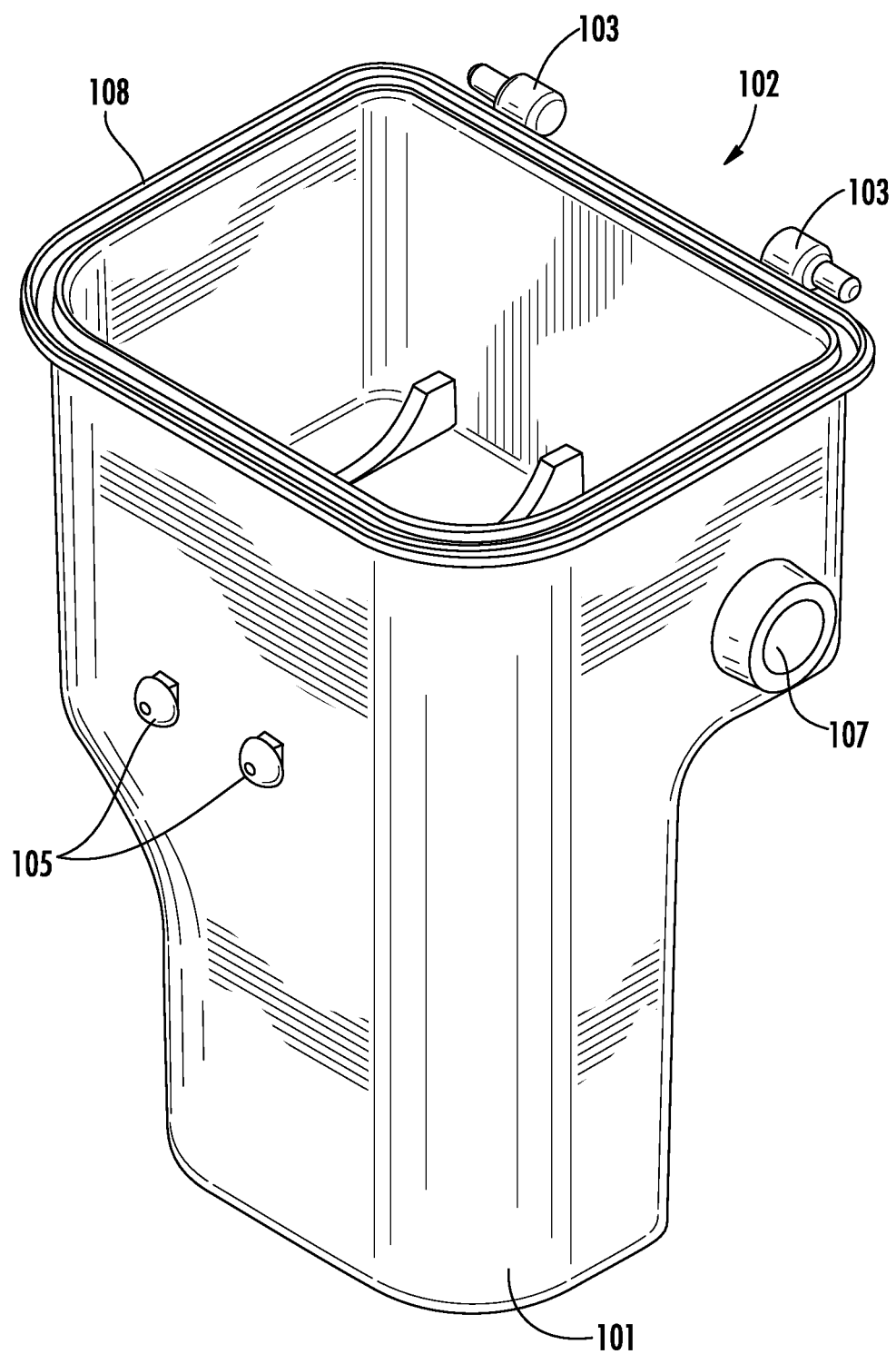
FIG. 2B shows an alternate embodiment of the housing of FIG. 2A, according to an exemplary embodiment.

Referring now to FIG. 2B, an alternate embodiment of housing 102 is shown. In FIG. 2B, cover axle 103 is shown as two disjoined axle segments. Each axle segment is shown independently connected to shell 101. Additionally, FIG. 2B shows peg 105 as a pair of circular pegs rather than a single rectangular peg (as shown in FIG. 2A). Pegs 105 and axle segments 103 may be on a same side or different side of housing 102. Housing 102 may be elongated, as depicted, or otherwise altered to accommodate design or aesthetic choices.

Figure 3A:
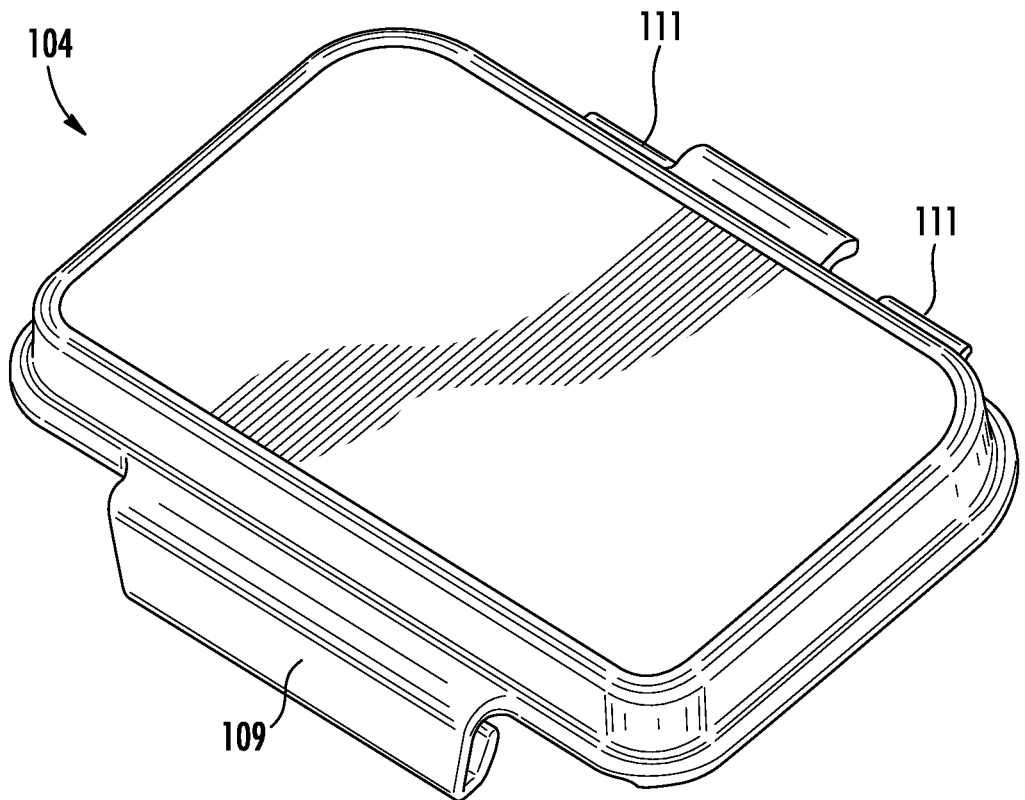
FIG. 3A is a drawing illustrating a perspective view of the cover in greater detail, according to an exemplary embodiment.

Referring now to FIG. 3A, cover 104 is shown in greater detail, according to an exemplary embodiment. Cover 104 may be configured to fit over the opening in housing 102, thereby forming an enclosure within which various electrical components of system 100 may be contained. Cover 104 may protect system 100 from external sources of damage (e.g., water damage, pollution, physical damage, chemical damage, electromagnetic radiation) as well as internal sources of damage (e.g., excessive heat generation, electrical damage, etc.). Cover 104 is shown to include hinges 111 and a clip 109.

Hinges 111 are shown extending from an edge of cover 104. Hinges 111 may be used to couple cover 104 (e.g., releasably or permanently) to cover axle 103. The coupling between hinges 111 and cover axle 103 may define an axis about which cover 104 may rotate between an open position and a closed position. Clip 109 may hold, lock, or otherwise secure cover 104 in the closed position by engaging an edge of housing 102. In some embodiments, clip 109 may be configured to maintain a desired pressure or clamping force between housing 102 and cover 104 when cover 104 is in the closed position. The clamping force may ensure that housing 102 and cover 104 provide a water-resistant or waterproof and/or contamination proof barrier around the other components of system 100.

Figure 3B:
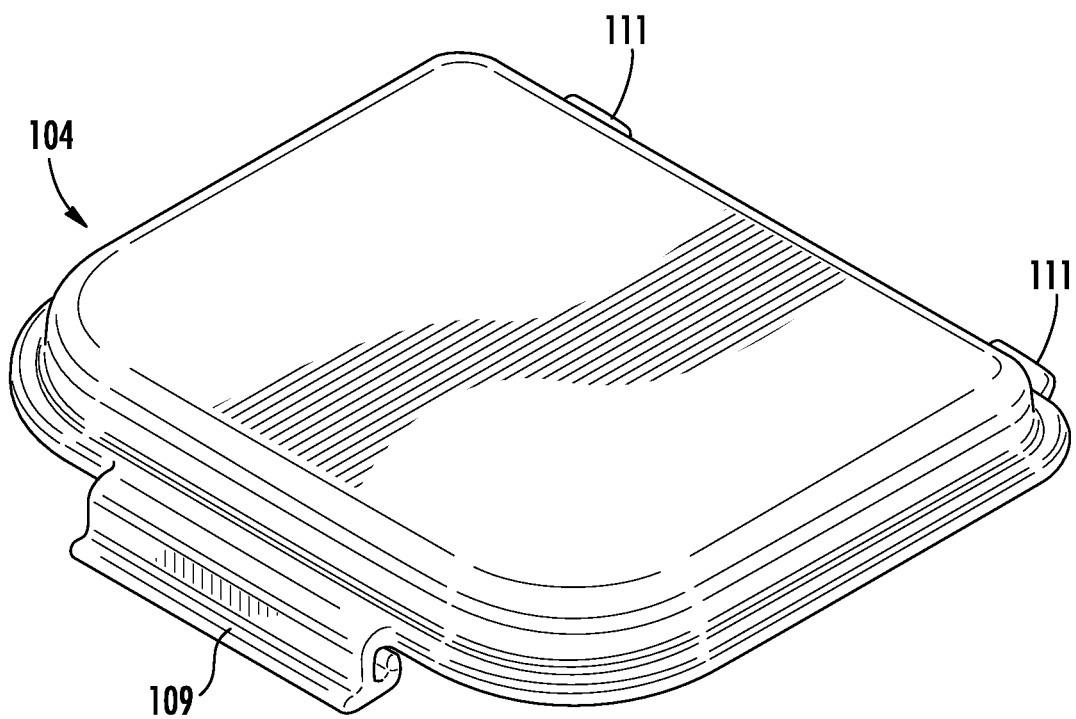
FIG. 3B shows an alternate embodiment of the cover of FIG. 3A, according to an exemplary embodiment.

FIG. 3B shows an alternate embodiment of cover 104. This alternate embodiment may allow for use of cover 104 with housing 102 wherein housing 102 has two disjoined cover axles 103. The disjoined cover axles 103 form an axis about which cover 104 rotates. Cover 104 rotates between an open and closed position. With cover 104 in the closed position, this embodiment may provide a water resistant or waterproof and/or contaminant proof barrier around system 100.

Figure 3C:
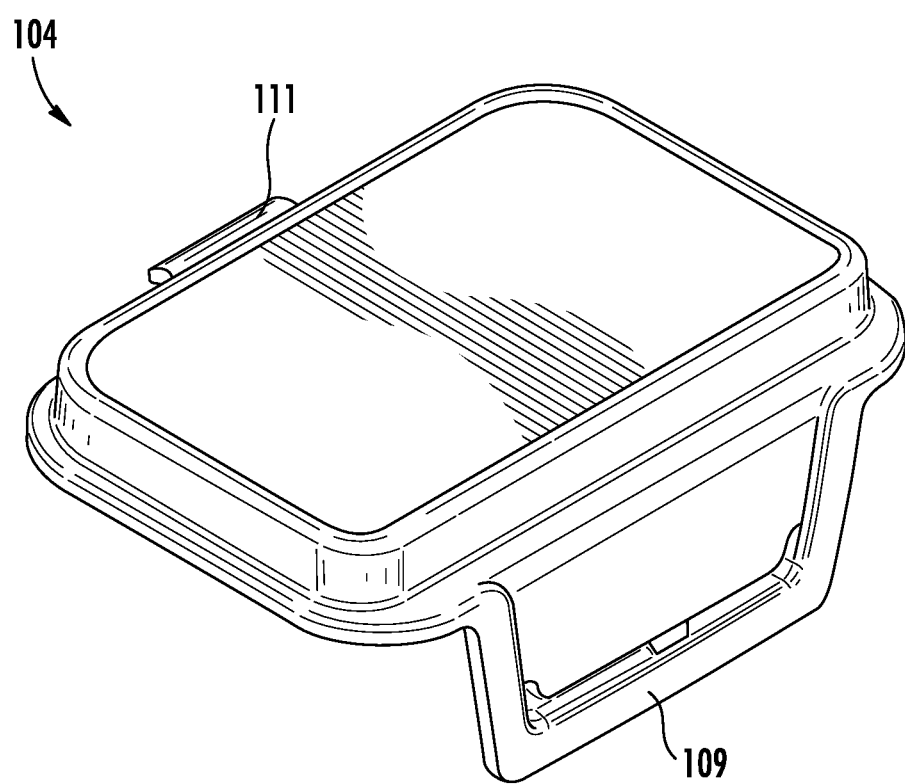
FIG. 3C shows an additional embodiment of the cover of FIG. 3A, according to an exemplary embodiment.

FIG. 3C shows a further embodiment of cover 104. Clip 109 extends further out from cover 104 to allow for easier manipulation and a location for labeling. Additionally, clip 109 may hold, lock, or otherwise secure cover 104 in the closed position by engaging a protruding structure of housing 102.

Figure 4A:
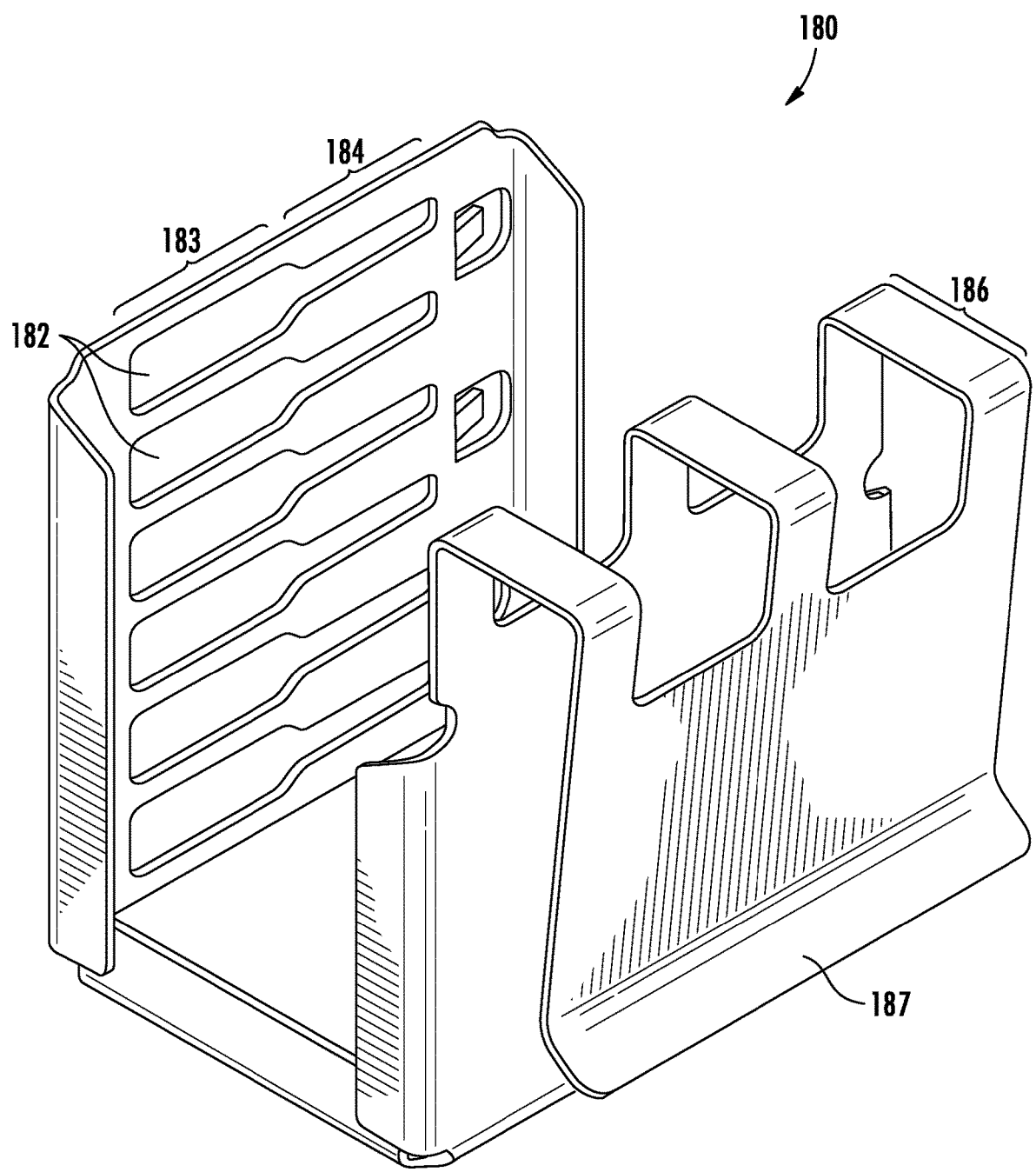
FIG. 4A is a drawing illustrating a perspective view of the positioning bracket in greater detail, according to an exemplary embodiment.

Referring now to FIG. 4A, positioning bracket 180 is shown in greater detail, according to an exemplary embodiment. Positioning bracket 180 is shown to include a plurality of positioning slots 182. Slots 182 may be configured to receive positioning peg 105 for attaching positioning bracket 180 to housing 102. Each of slots 182 is shown to include a wide portion 183 and a narrow portion 184. Peg 105 may be inserted into wide portion 183 and then moved horizontally into narrow portion 184. The plurality of slots 182 are shown arranged horizontally at various heights along positioning bracket 180. Each of slots 182 may be positioned at different heights. The plurality of heights associated with slots 182 may be used to adjust the position of housing 102 relative to positioning bracket 180. Positioning bracket 180 may be configured to operate with a plurality of pegs 105.

In some embodiments, positioning bracket 180 may have a shape which allows housing 102 to be secured, positioned, oriented, or attached to a variety of surfaces, ledges, and/or irregularly shaped objects. For example, positioning bracket 180 may have a "U-shaped" slot 186. Slot 186 may be configured to fit over an upper edge of a toilet reservoir wall (e.g., a front wall, a rear wall, a side wall, etc.). Similarly, positioning bracket 180 may include flange 187 to help secure positioning bracket 180 and aid in its positioning on an upper edge of a toilet reservoir. In other embodiments, positioning bracket 180 may extend between two or more reservoir wall segments in a bridged configuration.

Figure 4B:
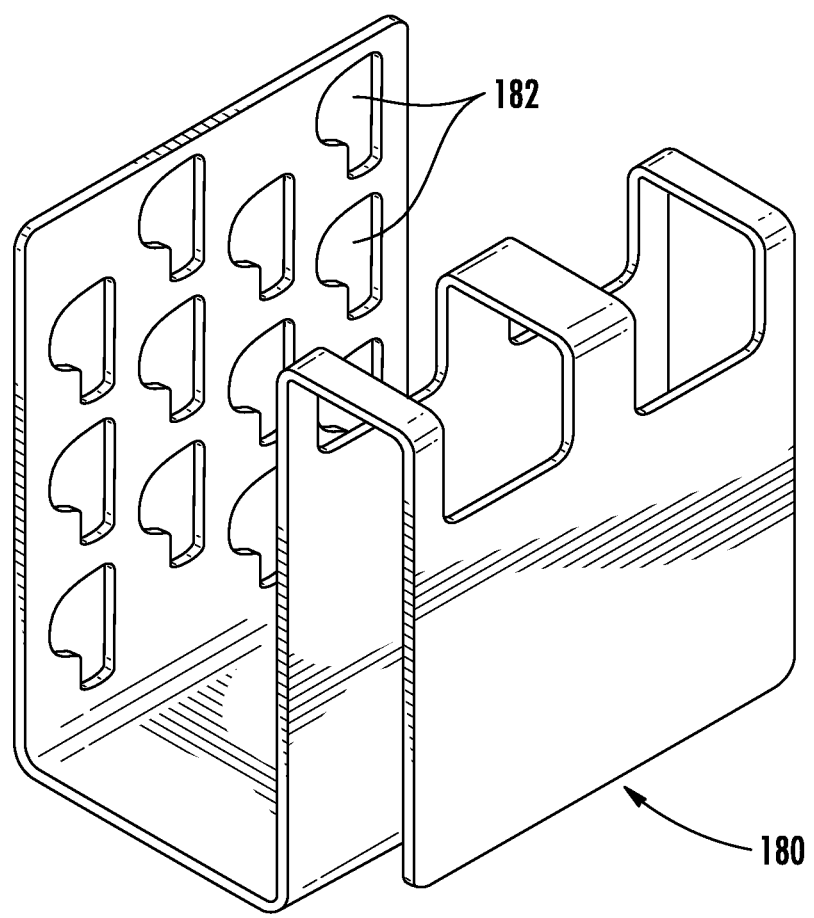
FIG. 4B shows an alternate embodiment of the positioning bracket of FIG. 4A, according to an exemplary embodiment.

Referring now to FIG. 4B, an alternate embodiment of positioning bracket 180 is shown. In FIG. 4B, slots 182 are shown as pairs of slots rather than a single slot for each height increment. The pairs of slots may be configured to receive the pairs of circular pegs 105 shown in FIG. 2B. Positioning bracket 180 is shown without flange 187. Flange 187 may be excluded from some embodiments of bracket 180 for design or aesthetic rationales (e.g. to improve ease of bracket installation, limit the profile of the bracket in installations with limited space, provide clean and/or straight lines, etc.).

Figure 5A:
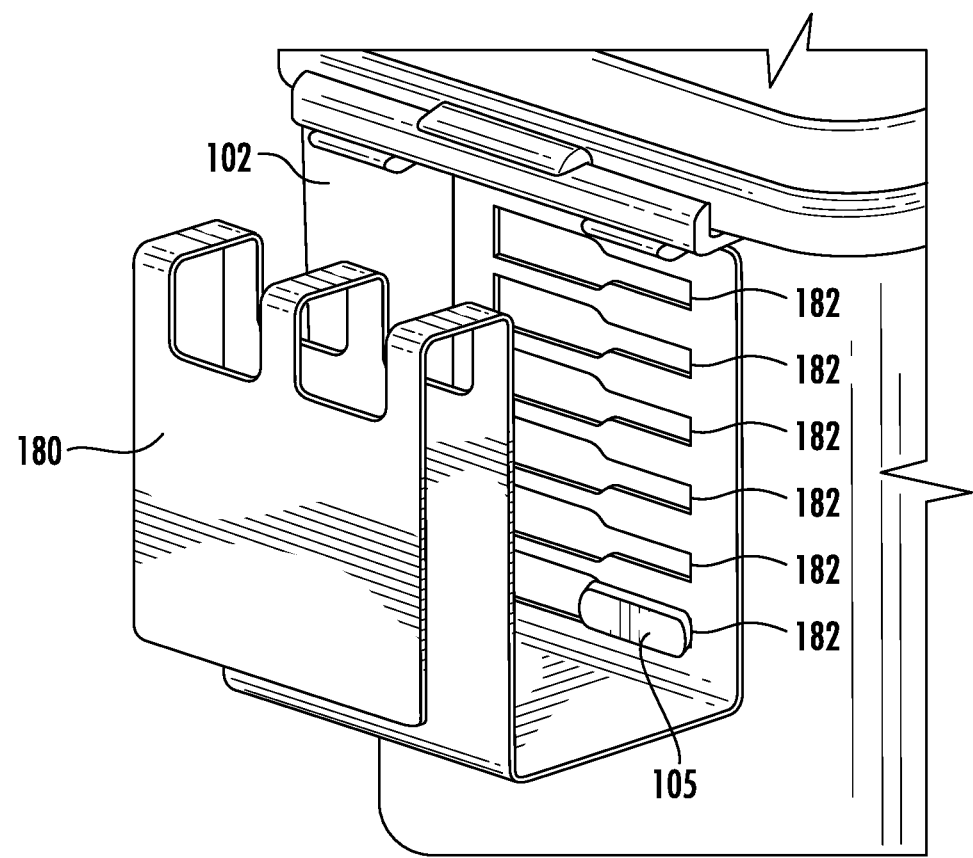
FIG. 5A is a drawing illustrating the connection between the housing of FIG. 2A and the positioning bracket of FIG. 4A, according to an exemplary embodiment.

Referring now to FIG. 5A, positioning bracket 180 is shown attached to housing 102, according to an exemplary embodiment. In the illustrated configuration, peg 105 is shown inserted into the lowest of slots 182. This configuration may be used for positioning housing 102 at a relatively low position within the toilet reservoir (e.g., closer to the bottom of the reservoir). The illustrated configuration may be used to adapt to a toilet with a relatively thick reservoir lid. To adjust the vertical position of housing 102, peg 105 may be inserted into a different slot 182. For example, peg 105 may be removed from the lowest of slots 182 and inserted into one of the higher slots. This adjustability may facilitate the installation of housing 102 at various heights within a toilet reservoir and/or adapt to a variety of reservoir lid thicknesses.

Figure 5B:
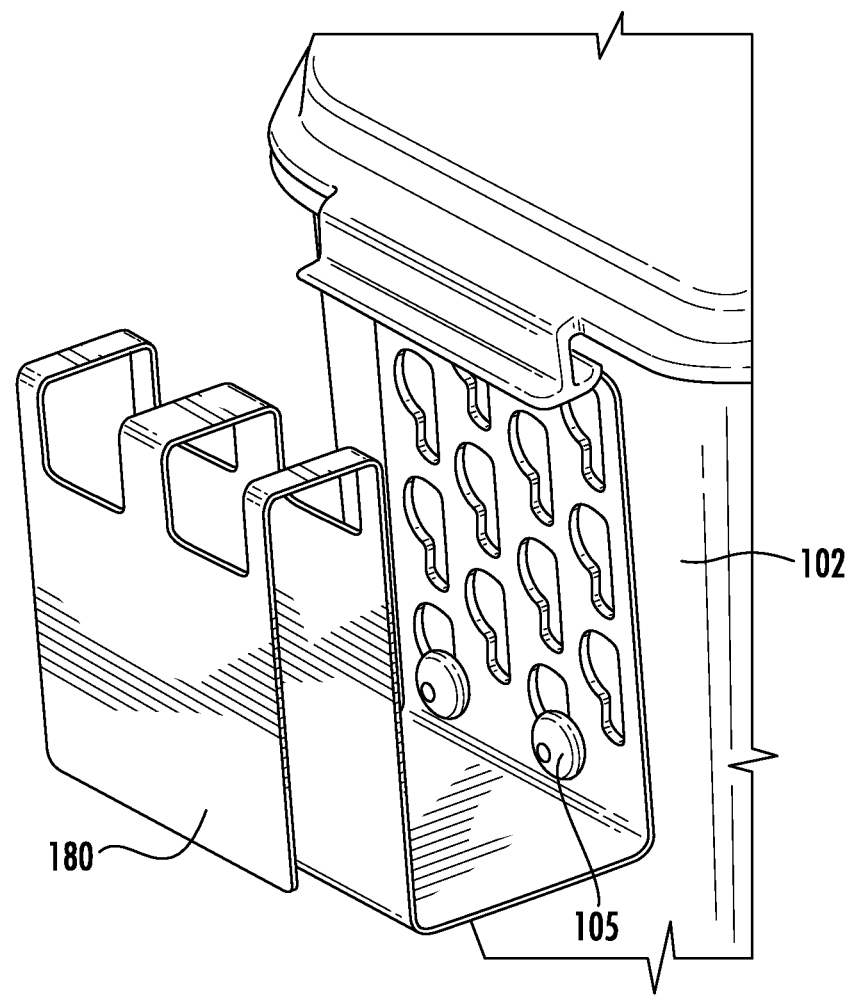
FIG. 5B is a drawing illustrating the connection between the housing of FIG. 2B and the positioning bracket of FIG. 4B, according to an exemplary embodiment.

FIG. 5B shows the positioning bracket 180 of FIG. 4B attached to the housing 102 of FIG. 2B. Bracket 180 has slots configured to accept round pegs. Bracket 180 is further configured to allow housing 102 to be positioned at different heights relative to bracket 180.

In some embodiments, positioning bracket 180 may be of a type other than is shown in FIGS. 4A and 4B. Positioning bracket 180 may be located entirely within the reservoir. Positioning bracket 180 may be attached to an inner surface of the reservoir with suction cups or adhesives. For example, the positioning bracket may be attached to the lid of the reservoir with adhesive thereby allowing the projected capacitive sensor to be adjusted. In some embodiments the positioning bracket may be a tripod. The positioning bracket may be free standing on the reservoir or may be secured to other components in the reservoir such as the fill valve. For example, the positioning bracket could be a tripod with one leg secured to the fill valve with brackets or bands. The positioning bracket may also be secured to the reservoir with adhesives or suction cups. The positioning bracket may have any number of legs. In some embodiments, the positioning bracket may be a truss supported by more or more legs. The positioning bracket may also be a platform supported by an interference fit with two or more walls of the reservoir. This positioning bracket would have openings for the equipment located in the reservoir such as the fill valve. A platform based positioning bracket would have the advantage of not requiring supporting legs, adhesives, or suction cups and would be located entirely within the reservoir.

In some embodiments, positioning bracket 180 may be used to position a single component of system 100 rather than all the components and housing 102. The positioning bracket may also be used to position a group or subset of the components of the system. For example, the positioning bracket may position the projected capacitive sensor and processing circuit. Continuing the example, the motor assembly, wheel assembly, and power supply may be located on the fill valve. In some embodiments, multiple positioning brackets may be used for a variety of components of system 100. For example, one positioning bracket may hold the projected capacitive sensor near the lid of the reservoir with a second positioning bracket securing the motor assembly, processing circuit, wheel assembly, and power supply near the flush valve. The components may be connected wirelessly or with wires.

Figure 6A:
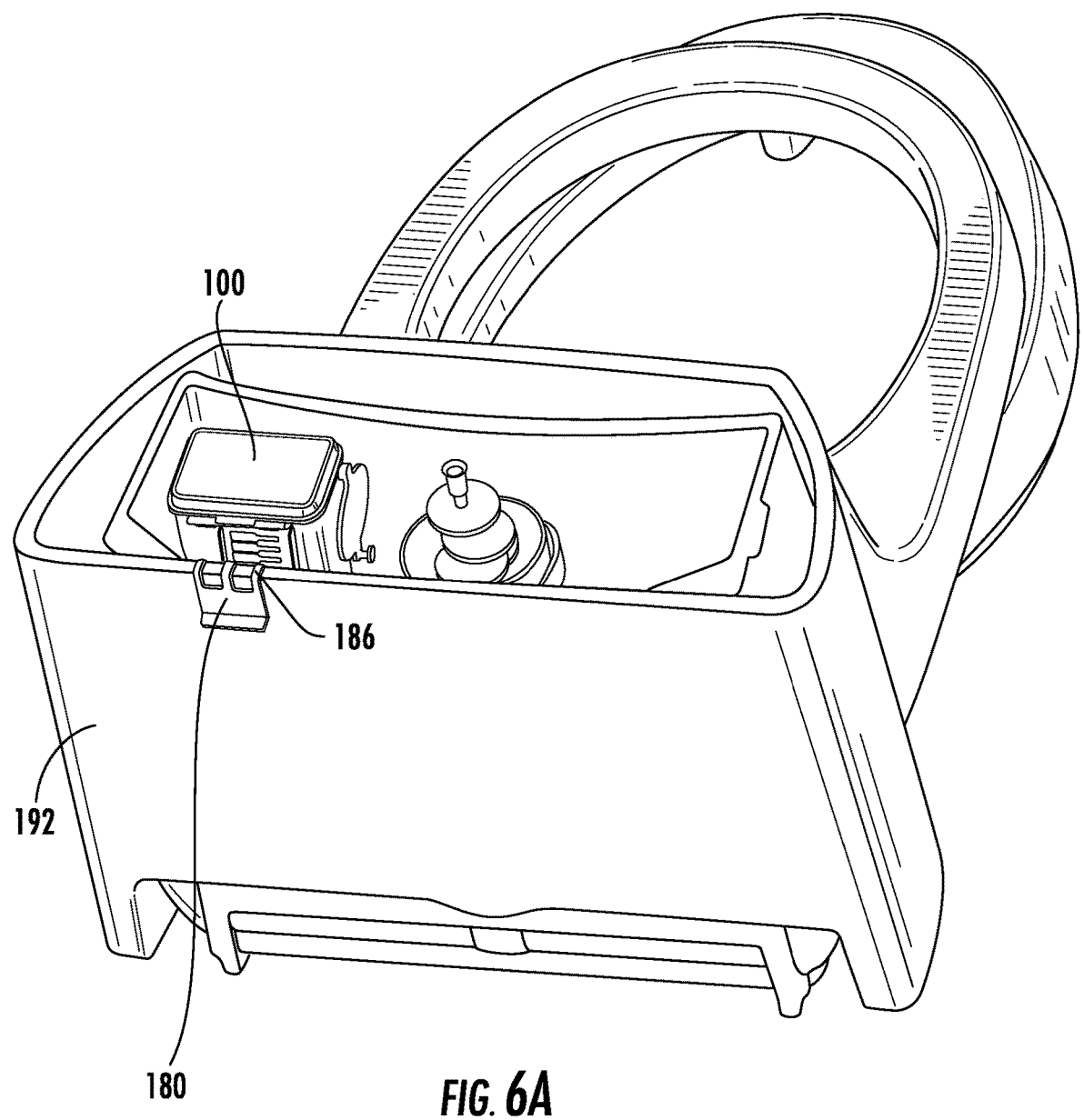
FIG. 6A is a drawing illustrating the positioning bracket of FIG. 4A hanging from a side wall of a toilet reservoir and positioning the touchless actuation system of FIG. 1A within the reservoir, according to an exemplary embodiment.

Referring now to FIG. 6A, positioning bracket 180 is shown mounted on a rear wall 192 of a toilet reservoir 190, according to an exemplary embodiment. U-shaped slot 186 is shown inserted over an upper edge of rear wall 192, securing system 100 within reservoir 190. A reservoir lid (not shown) may be placed over the top of reservoir 190, completely concealing system 100 within reservoir 190. Advantageously, as it may be desirable to locate system 100 as close as possible to the reservoir lid, positioning slots 182 may allow the vertical position of system 100 to be adjusted. A close placement of system 100 to the reservoir lid may assist in detecting an object in a detection region above the reservoir lid.

Figure 6B:
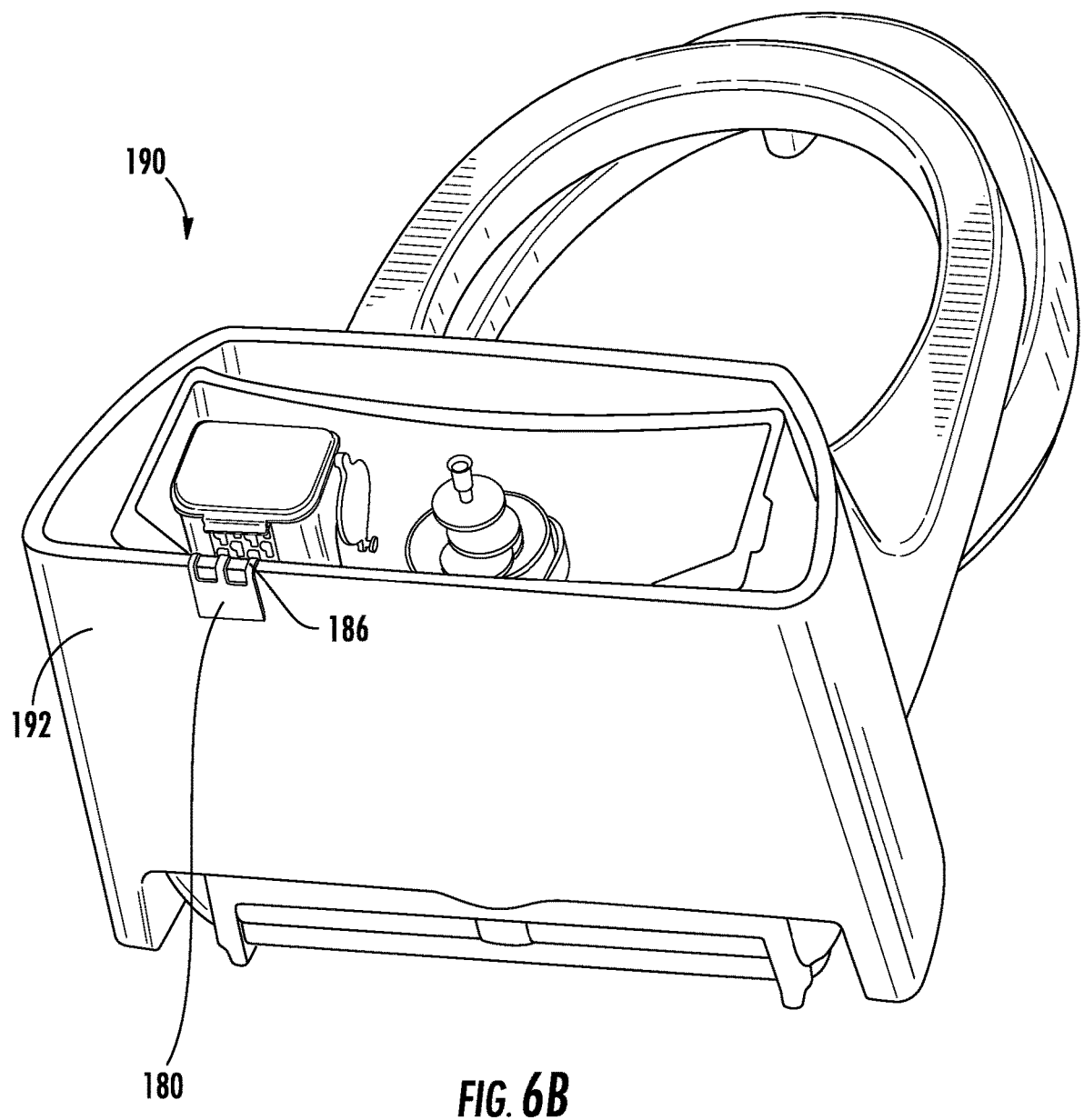
FIG. 6B is a drawing illustrating the positioning bracket of FIG. 4B hanging from a side wall of a toilet reservoir and positioning the touchless actuation system of FIG. 1B within the reservoir, according to an exemplary embodiment.

FIG. 6B shows the system 100 of FIG. 1B mounted on a rear wall of a toilet reservoir. The shape of housing 102 may be altered so that housing 102 fits within a toilet reservoir. Housing 102 may have altered dimensions to fit one particular model of toilet reservoir. In some embodiments, housing 102 may be configured to have dimensions which allow the housing to fit multiple toilet reservoirs. The dimensions of housing 102 may be optimized to allow housing 102 to fit the widest range of toilet reservoirs possible or a range subset of toilet reservoir designs. Positioning bracket 180 may be selected from alternative embodiments to provide the desired height adjustment and position of housing 102 within the toilet reservoir.

Figure 7A:
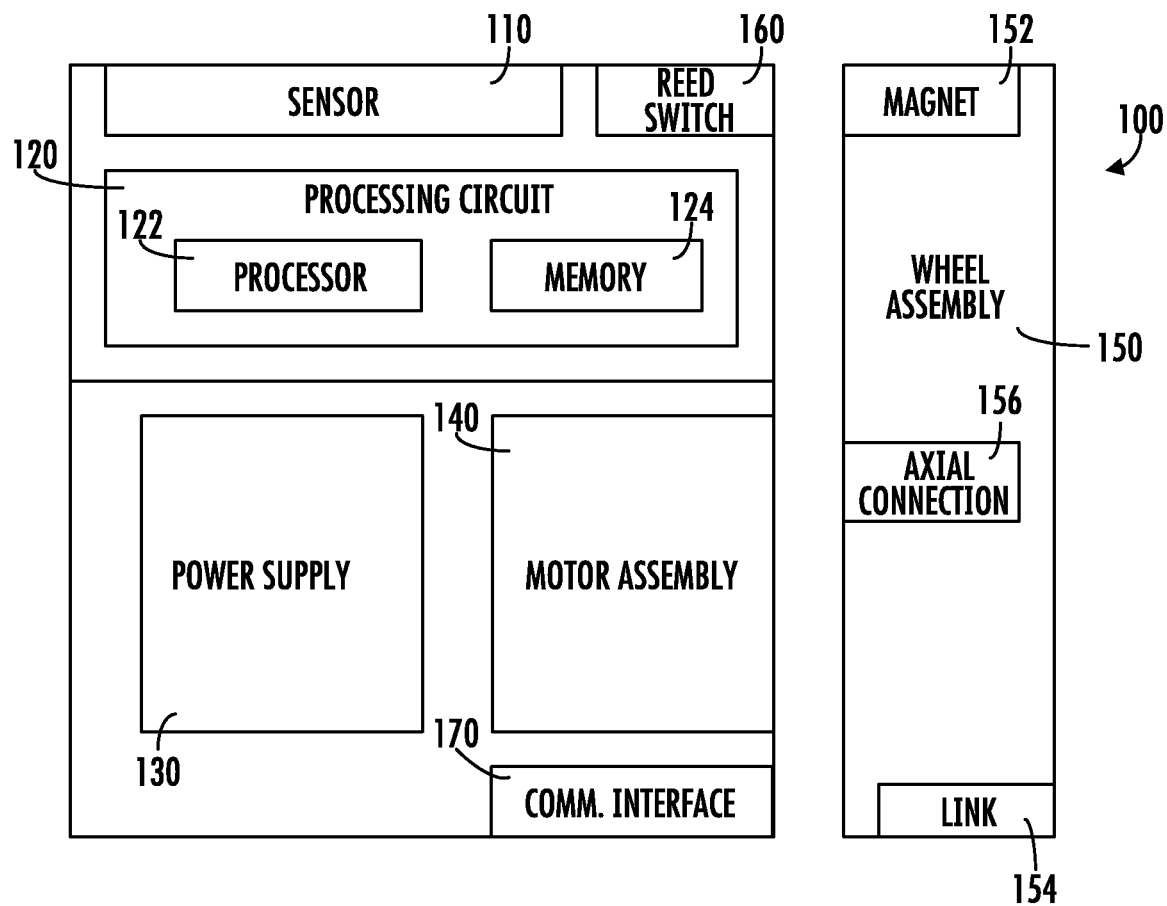
FIG. 7A is a block diagram showing the electrical connections and communication paths between components of the touchless actuation system, according to an exemplary embodiment.

Referring now to FIG. 7A, a block diagram of system 100 is shown, according to an exemplary embodiment. System 100 is shown to include a sensor 110, a processing circuit 120 including a processor 122 and memory 124, a power supply 130, and a motor assembly 140. System 100 is further shown to include a wheel assembly 150, a reed switch 160, and a communications interface 170.

In operation, sensor 110 may produce a signal indicating the presence of an object (e.g., a user's hand or forearm) within a detection region and transmit the signal to processing circuit 120. Processing circuit 120 may respond by activating motor assembly 140, thereby causing wheel assembly 150 to rotate. Wheel assembly 150 may be coupled to a flush valve (e.g., a flapper, a canister-style seal, etc.) via a linking chain or other coupling mechanism such that rotation of wheel assembly 150 actuates flushing of the toilet (e.g., by lifting the flapper or seal covering a water outlet at the bottom of the reservoir).

In some embodiments, sensor 110 is a projected capacitive sensor. Sensor 110 may use projected capacitive technology to detect the presence of an electromagnetic field-absorbing object within a detection region near sensor 110. For example, sensor 110 may include an electrode, a plate, or other conductive or semi-conductive object defining one half of a capacitor. Sensor 110 may project an electromagnetic field into the detection region from the electrode and produce a signal indicating a capacitance relative to ground. An electromagnetic field-absorbing object (e.g., a hand, forearm, or other body part of a user) within the detection region may effectively form the second half of the capacitor such that movement of the object toward or away from sensor 110 changes the measured capacitance.

In some embodiments, sensor 110 may be electrically shorted (e.g., grounded, connected, linked, etc.) to one or more objects within the toilet reservoir. For example, the electrode or plate defining one half of the capacitor may be shorted to a side face of motor assembly 140, wheel assembly 150, or housing 102. Connecting sensor 110 to such components may increase the detection region (i.e., the sensing field) of sensor 110 by using the shorted components as additional surfaces for the capacitor half. Advantageously, such an increase in the sensing field may reduce or eliminate the effect of a change in the water level within the toilet reservoir on the signal produced by sensor 110 (e.g., by allowing sensor 110 to "see" the water at all times). In some embodiments, sensor 110 may be shorted (e.g., electrically connected, grounded, etc.) to the water within the reservoir, thereby preventing an increase or decrease in the water level from affecting the measured capacitance.

Advantageously, the use of projected capacitive technology in system 100 eliminates the need for an optical path or line of sight between sensor 110 and the detection region. The electromagnetic field produced by sensor 110 may penetrate the vitreous or other material comprising the reservoir lid, thereby allowing sensor 110 to "see through" the optically opaque structures of the reservoir. In other embodiments, sensor 110 may be a microwave sensor, a magnetic sensor, or other type of sensor capable of detecting the presence of an object without requiring an optical path thereto. By eliminating the need for an optical path between sensor 110 and the detection region, sensor 110 may be completely concealed within an optically opaque reservoir (e.g., without providing a sensor window or hole in the reservoir body). This advantage may assist in retrofitting existing toilets with system 100 without requiring the replacement or modification of any existing components (e.g., replacing the reservoir lid, drilling a hole in the reservoir, replacing the handle, etc.).

In some embodiments, system 100 may be located outside the reservoir. For example, system 100 may be used in conjunction with "in-wall" tanks and may be installed within a solid or opaque wall adjacent to the in-wall tank. Optionally, system 100 may be installed within a ceiling, floor, cabinet, or other structure in proximity to the toilet. In some embodiments, an optical path may exist between sensor 110 and the detection region. However, an optical path is not required.

In some embodiments, the sensor of system 100 may be located in a position remote from the remaining components of system 100 (e.g. power supply, motor assembly, processing circuit). In some embodiments, the sensor is located in the reservoir positioned by the positioning bracket while the processing circuit and power supply are located outside the reservoir. The sensor may be connected wirelessly or with wires to the processing circuit. The processing circuit may be located on the portion of the positing bracket extending outside of the reservoir, in a cabinet, in a wall, or in any other location. The motor assembly may be connected to the processing circuit wirelessly or with wires. The motor assembly is also connected to a power supply. In some embodiments, the power supply may be located outside the reservoir and connected to the motor assembly located in the reservoir. The motor assembly and the projected capacitive sensor may be separate from one another yet both are still located in the reservoir. For example, the projected capacitive sensor may be located on the portion of the positioning bracket inside the reservoir, and the motor assembly may be located on fill valve.

In some embodiments, all the components of system 100 may be located in the reservoir but may not be located within a single housing 102. Multiple housings may be used with each component located in its own housing or some components sharing a housing. For example, the projected capacitive sensor may be located near the lid of the reservoir, either held in place with a positioning bracket or attached directly to the lid of the reservoir (e.g. with adhesive, suction cups, etc.). Continuing the example, the motor assembly may be located on the fill valve with the power supply and processing circuit resting on the bottom of the reservoir. The components may be connected wirelessly or with wires. Other positions are possible for each component including attached to reservoir surfaces (e.g. with adhesive, with suction cups, etc.), to the fill valve, to the flush valve, or to a positioning bracket of any type.

Still referring to FIG. 7A, system 100 may further include a processing circuit 120. Processing circuit 120 may be part of an electronics package configured to operate and control sensor 110 and motor assembly 140. Processing circuit 120 may include a printed circuit board (PCB) having a processor 122 and memory 124 contained therein. Processor 122 may be implemented as a general purpose processor, an application specific integrated circuit (ASIC), one or more field programmable gate arrays (FPGAs), a group of processing components, or other suitable electronic processing components.

Memory 124 may include one or more devices (e.g., RAM, ROM, Flash memory, hard disk storage, etc.) for storing data and/or computer code for completing and/or facilitating the various processes, layers, and modules described in the present disclosure. Memory 124 may comprise volatile memory or non-volatile memory. Memory 124 may include database components, object code components, script components, or any other type of information structure for supporting the various activities and information structures described in the present disclosure. According to an exemplary embodiment, the memory 124 is communicably connected to the processor 122 and includes computer instructions for executing (e.g., the processor 122) one or more processes described herein.

In some embodiments, processing circuit 120 may be communicably connected to sensor 110 and motor assembly 140. Processing circuit 120 may interpret a signal produced by sensor 110 and determine whether to activate motor assembly 140 based on said signal. In some embodiments, processing circuit 120 may be configured to monitor a time since motor assembly 140 was last activated. Upon receiving a detection signal from sensor 110, processing circuit 120 may compare the time since motor assembly 140 was last activated with a time threshold. Processing circuit 120 may prevent reactivation of motor assembly 140 if the time since the most recent previous activation is less than the time threshold. The time threshold may prevent re-flushing of the toilet until a sufficient time has elapsed to allow the reservoir to refill.

Still referring to FIG. 7A, system 100 may further include a motor assembly 140. Motor assembly 140 may be a general purpose electric motor (e.g., a brushed DC motor) configured to rotate a shaft in response to an electric current. The shaft of the motor may extend through port 107 in shell 101 and may connect to an actuation mechanism outside housing 102. Motor assembly 140 may be configured to accept an alternating current or a direct current and may include a voltage converter or an AC/DC converter. Motor assembly 140 may include a current-limited or torque-limited motor to prevent damage to system 100 in the event that rotation is blocked. In other embodiments, motor assembly 140 may include a clutch or other torque-sensitive component configured to allow slippage between the motor shaft and an electromagnetic rotor within the motor if the output torque exceeds a threshold value. Motor assembly 140 may include a stepper motor, brushed DC motor, brushless DC motor, AC induction motor, etc. Motor assembly 140 may further include a gearbox. The gearbox may provide a mechanical connection between wheel assembly 150 and the motor. The gearbox may, in conjunction with the motor, provide an amount of torque sufficient to rotate wheel assembly 150. The amount of torque may be selected through variations in either the motor or gearbox or a combination of the two. The amount of torque may be optimized for specific applications through this selection process. The gearbox may also be selected to ensure that the torque does not exceed a torque threshold.

In some embodiments, processing circuit 120 may be configured to monitor the torque exerted by motor assembly 140 or the electric current provided to motor assembly 140. Processing circuit 120 may be configured to initiate one or more safety precautions if the electric current exceeds a current threshold or the torque exceeds a torque threshold. The safety precautions may include deactivating motor assembly 140, limiting the electric current provided to motor assembly 140, limiting the torque exerted by motor assembly 140, and/or activating a warning indicator (e.g., a piezoelectric speaker, an LED or other light, etc.).

Still referring to FIG. 7A, system 100 may further include a power supply 130. Power supply 130 may provide power to motor assembly 140 as well as the other electronic components of system 100. In some embodiments, processing circuit 120 may determine whether to deliver power to motor assembly 140 from power supply 130 based on the signal received from sensor 110. Power supply 130 may include batteries (e.g., "AA" batteries, "C" batteries, nine volt batteries, twelve volt batteries, rechargeable batteries, etc.) contained within housing 102. In some embodiments, processing circuit 120 may be configured to activate a warning indicator (e.g., a piezoelectric speaker, an LED or other light, etc.) to inform a user that the batteries require replacement or that another error has occurred (e.g., stuck motor, non-responsive sensor, etc.). In some embodiments, power supply 130 may include a power converter (e.g., a voltage converter, an AC/DC converter, etc.). In some embodiments, power supply 130 may receive power from a power source external to housing 102 (e.g. an electric outlet connected to a traditional power grid). In other embodiments, the power source (e.g., batteries) is contained within housing 102.

Still referring to FIG. 7A, in some embodiments, system 100 may include a communications interface 170. Communications interface 170 may include wired or wireless interfaces (e.g., jacks, antennas, transmitters, receivers, transceivers, wire terminals, etc.) for conducting data communications between system 100 and external sources. In an exemplary embodiment, communications interface 170 may be a radio receiver. Communications interface 170 may be used as a supplemental trigger for actuating flushing in addition to the signal received via sensor 110. For example, a user may transmit a signal (e.g., via a remote control, a wired control panel, touch sensor, or any other input device) to communications interface 170. The transmitted signal may be interpreted by processing circuit 120 and used as a basis for activating motor assembly 140. In some embodiments, communications interface 170 may further be used to send a warning signal (e.g. that the batteries need to be replaced or another error has occurred) to an external system.

Figure 7B:
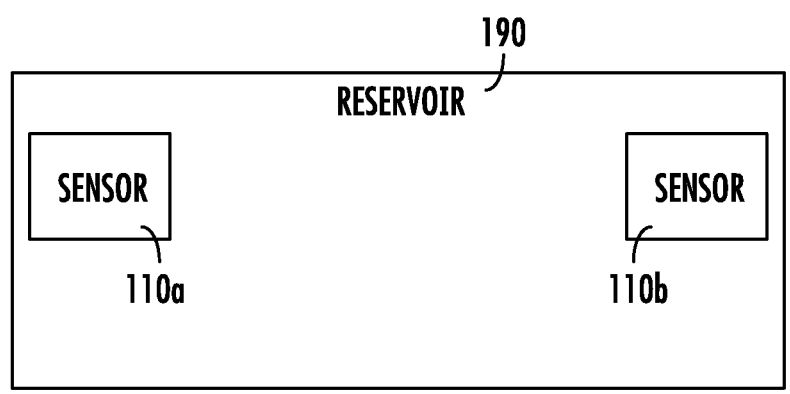
FIG. 7B is a drawing showing multiple sensors of the touchless actuation system positioned within a toilet reservoir, according to an exemplary embodiment.

In some embodiments, system 100 may include two or more sensors 110. Referring now to FIG. 7B, system 100 is shown to include a first sensor 110a and a second sensor 110b, according to an exemplary embodiment. Sensors 110a, 110b may be a pair of projected capacitive sensors, a projected capacitive sensor and a different type of sensor (e.g., microwave, infrared, magnetic, etc.), or a pair of non-capacitive sensors. Each of sensors 110a, 110b may or may not require an optical path to the detection region. In the illustrated embodiment, sensors 110a, 110b are shown positioned within a toilet reservoir 190. Various other sensor positions may be used (e.g., adjacent to the reservoir; in the ceiling, floor, or wall near the toilet; in a cabinet, etc.). One or more sensors may be located outside a toilet reservoir. In some embodiments, sensor 110a is mounted on a first surface of the reservoir and sensor 110b is mounted on a second surface of the reservoir (e.g., via respective positioning brackets 180, adhesive compounds, or other positioning devices). The mounting surfaces of the reservoir may be opposite surfaces (e.g., left and right, front and back, top and bottom) or adjacent surfaces (e.g., front and left, front and right, right and back, etc.). Sensors may also be positioned on the underside of the reservoir lid. Sensors 110a, 110b may have overlapping or discrete detection regions.

Processing circuit 120 may determine whether to activate motor assembly 140 based on input received from both sensors 110a, 110b. Advantageously, multiple sensors 110 may provide processing circuit 120 with the ability to detect a direction in which an object is moving through the detection region or regions. For example, sensors 110a, 110b may be proximity sensors, each producing a signal based on a distance between a detected object and the sensor. Processing circuit 120 may interpret the signals from sensors 110a, 110b and determine whether an object is closer to sensor 110a or sensor 110b based on the sensor signals. If an object is initially determined to be closer to sensor 110a and subsequently determined to be closer to sensor 110b, processing circuit 120 may estimate that the object is moving through the detection region from a point nearer to sensor 110a to a point nearer to sensor 110b.

In some embodiments, the sensors may detect and record a number of different parameters and values. Recoded values may include the speed at which the object is moving through the detection region, the duration of the object in the detection region, or the sequence in which the object enters multiple detection regions. These recorded values may be used to estimate various user gestures corresponding to different functions of the system. These functions may include short flushes, long flushes, raising or lowering the toilet seat or cover, dispensing deodorant, and initiating a cleaning cycle.

Multiple sensors 110 may assist processing circuit 120 in identifying and/or distinguishing various types of inputs received via sensors 110a, 110b. For example, in some embodiments, processing circuit 120 may be configured to estimate a gesture performed by a user. The gesture may include waving a hand over the toilet reservoir (e.g., horizontally, vertically, diagonally, in circles, etc.). Multiple sensors 110 may provide processing circuit 120 with sufficient inputs to distinguish a "left-to-right" wave from a "right-to-left" wave. In some embodiments, processing circuit 120 may initiate one or more supplemental actions based on the estimated gesture. The supplemental actions may include initiating a low volume flush, initiating a high volume flush, dispensing a sanitizer or deodorant, initiating a cleaning process, raising or lowering a seat or lid, etc.

In some embodiments, a further sensor or sensors may be included to monitor the position of the toilet seat and/or cover. A user gesture may be defined which lowers or raises the toilet seat and/or cover when the gesture is detected by one or more projected capacitive sensors. A single gesture may both raise and lower the seat and/or cover with the action being determined by the current state of the seat and/or cover. For example, a position sensor may determine that the toilet seat is in the down position. A user performing the appropriate gesture (e.g. a long pause over the sensor) would trigger the seat to raise. The same seat position sensor would now register the seat as being raised. When the user performs the same gesture again (e.g. a long pause over the sensor), the seat would be lowered.

In some embodiments, gestures performed by the user may include "left-to-right" waves and "right-to-left" waves. Gestures performed by the user may also include vertical, diagonal, and circular movements of the user's hand or forearm. In some embodiments gestures performed by the user may include a short pause over the sensor, a long pause over the sensor, or any number of pauses for determined lengths of time. For example, a user's short pause over a sensor may correspond to activating the motor assembly for a short flush. A user's long pause over a sensor may initiate a long flush. A still longer pause may initiate a cleaning cycle or deodorant release. The pause set of gestures may be used in embodiments with one or more sensors.

Multiple sensors 110 may also provide processing circuit 120 with sufficient inputs to distinguish a user gesture from various other factors which may potentially affect the signals received from sensors 110a, 110b. For example, the water level in the toilet reservoir may affect the signals received from sensors 110a, 110b. As the water level in the reservoir rises and falls (e.g., due to filling the reservoir and flushing the toilet), the signals received from sensors 110a, 110b may increase or decrease. However, if the signals from both sensors 110a, 110b increase or decrease together (e.g., simultaneously, proportionally, etc.), processing circuit 120 may attribute such an increase or decrease to a change in the water level rather than a user gesture. In some embodiments, one sensor (e.g., sensor 110a) may be used to monitor the water level in the reservoir while another sensor (e.g., sensor 110b) may be used to detect a user input above the reservoir lid. Processing circuit 120 may use the input received from one sensor to calibrate or adjust the input received from another sensor to compensate for factors other than a user gesture which may affect the sensor signal.

Figure 7C:
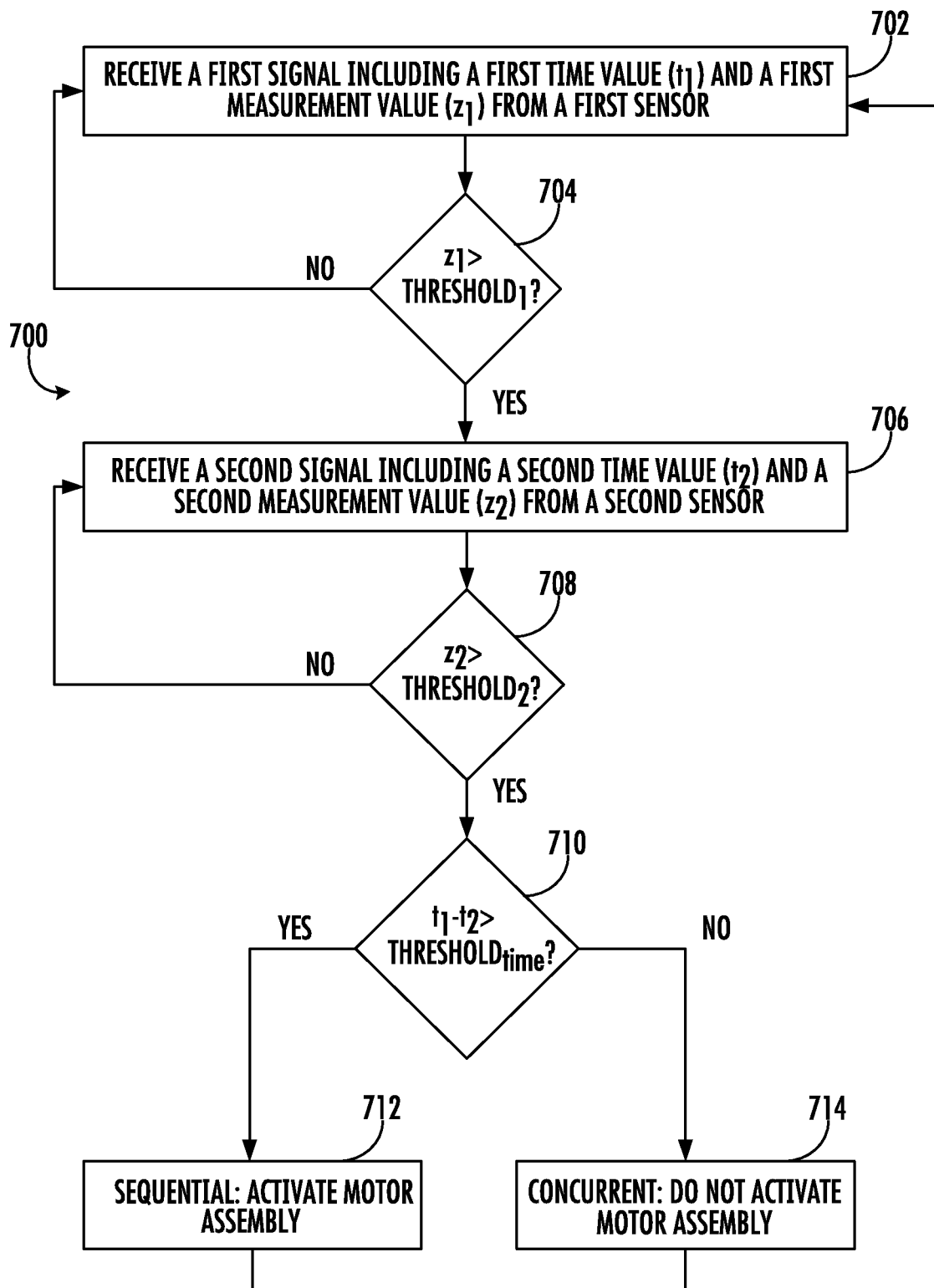
FIG. 7C is a flowchart of a process for interpreting input signals received from the multiple sensors shown in FIG. 7B and determining whether to actuate flushing based on the received signals, according to an exemplary embodiment.

Referring now to FIG. 7C, a flowchart of a process 700 for interpreting the signals received from multiple sensors (e.g., sensors 110a, 110b) is shown, according to an exemplary embodiment. Process 700 may be used by processing circuit 120 to identify or distinguish various inputs detected by sensors 110a, 110b and to initiate one or more actions (e.g., activating motor assembly 140, initiating a low or high volume flush, etc.) based on such inputs. In some embodiments, process 700 may be used to distinguish a user gesture (e.g., waving a hand above the reservoir) from an increase or decrease of the water level inside the reservoir. Process 700 may be used to distinguish inputs from non-user intended input (e.g. a change in the electromagnetic field produced by the sensor not intended to flush the toilet).

Process 700 is shown to include receiving a first signal including a first time value $t_1$ and a first measurement value $z_1$ from a first sensor (step 702). The first sensor may be either of sensors 110a, 110b or a different sensor. In some embodiments, the first sensor is a projected capacitive sensor, a microwave sensor, or another touchless sensor capable of detecting an object without requiring an optical path between the sensor and the detected object. In other embodiments, the first sensor may be an infrared sensor, a visible light sensor, or other type of optical sensor. Measurement value $z_1$ may be a sensor reading indicating a distance between a detected object and the first sensor, a velocity of the detected object relative to the first sensor, or any other indicator of an object (e.g. a user's hand or forearm or an electromagnetic field-absorbing object) moving into the first sensor's detection region. Time value $t_1$ may be a data value indicating a time at which measurement value $z_1$ is measured.

Process 700 is further shown to include comparing measurement value $z_1$ with a first threshold value (step 704). The first threshold value may be a static value (e.g., specified by a user, stored in memory, etc.) or a dynamic value (e.g., adaptively determined based on a history of recent measurements, etc.) indicating a threshold for measurement value $z_1$. A measurement value $z_1$ greater than the first threshold value may indicate that an object has moved into the detection region. However, a measurement value $z_1$ greater than the first threshold value may also be attributable to a change in the water level within the toilet reservoir. If the first measurement value $z_1$ is not greater than the first threshold value, process 700 is shown to include repeating step 702.

If the first measurement value $z_1$ is greater than the first threshold value, process 700 is shown to include receiving a second signal including a second time value $t_2$ and a second measurement value $z_2$ from a second sensor (step 706). The second sensor may be either of sensors 110*a*,110*b* or a different sensor. In some embodiments, the second sensor is a projected capacitive sensor, a microwave sensor, or another touchless sensor capable of detecting an object without requiring an optical path between the sensor and the detected object. In other embodiments, the second sensor may be an infrared sensor, a visible light sensor, or other type of optical sensor. Measurement value $z_2$ may be a sensor reading indicating a distance between a detected object and the second sensor, a velocity of the detected object relative to the second sensor, or any other indicator of an object (e.g. a user's hand or forearm or an electromagnetic field-absorbing object) moving into the second sensor's detection region. Time value $t_2$ may be a data value indicating a time at which measurement value $z_2$ is measured. In some embodiments, step 702 and step 706 may be performed concurrently.

Process 700 is further shown to include comparing measurement value $z_2$ with a second threshold value (step 708). The second threshold value may be a static or dynamic threshold for the second measurement value $z_2$. The second threshold value may be equal to the first threshold value, less than the first threshold value, or greater than the first threshold value. A measurement value $z_2$ greater than the second threshold value may indicate that an object has moved into the detection region. However, a measurement value $z_2$ greater than the second threshold value may also be attributable to a change in the water level within the toilet reservoir. If the second measurement value $z_2$ is not greater than the second threshold value, process 700 is shown to include repeating step 706. In some embodiments, step 704 and step 708 may be performed concurrently.

If the second measurement value $z_2$ is greater than the second threshold value, process 700 is shown to include comparing the difference between time values $t_1$ and $t_2$ with a time threshold (step 710). The difference between time values $t_1$ and $t_2$ (e.g., $t_1-t_2$) may indicate whether the first and second sensors have detected an object sequentially or concurrently. If $t_1-t_2$ exceeds the time threshold, it may be determined that the first and second sensors have detected an object sequentially (e.g., a hand waving horizontally above the reservoir lid) (step 712). If $t_1-t_2$ does not exceed the time threshold, it may be determined that the first and second sensors have detected an object concurrently (e.g., a water level uniformly increasing or decreasing within the reservoir) (step 714). Process 700 is shown to include activating the motor assembly if the detection is sequential (step 712) and not activating the motor assembly if the detection is concurrent (step 714). In some embodiments, the difference between $t_1$ and $t_2$ may be compared to the time threshold. It may then be determined, using processing circuit 120, if a gesture performed by the user has occurred. In some embodiments, process 700 may be repeated iteratively each time a measurement signal is received.

Figure 7D:
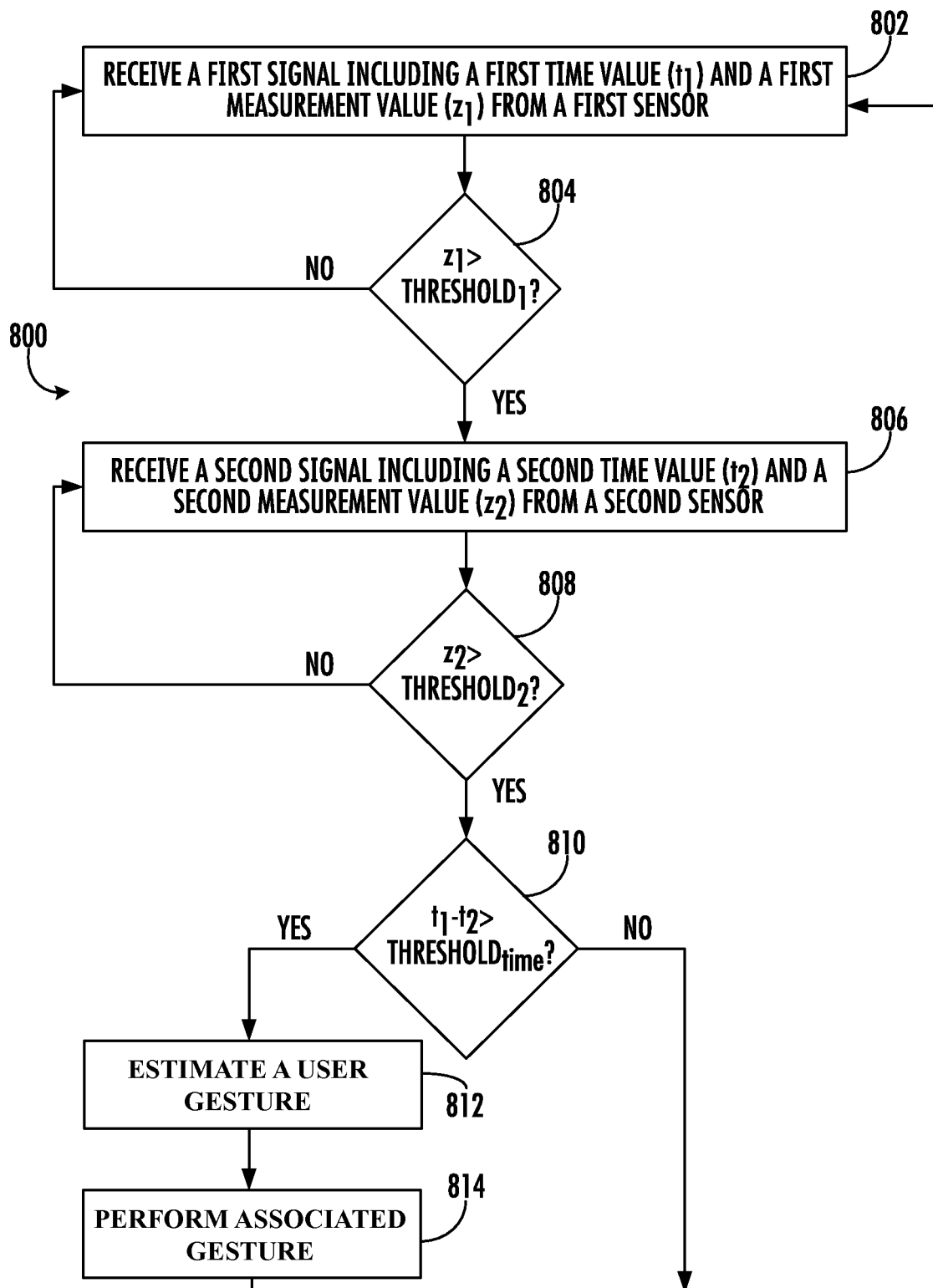
FIG. 7D is a flowchart of a process for interpreting input signals received by multiple sensors and determine an action to take based on an estimated user gesture.

Referring now to FIG. 7D, a flowchart of a process 800 for interpreting the signals received from multiple sensors (e.g., sensors 110*a*, 110*b*) is shown, according to an exemplary embodiment. Process 800 may be used by processing circuit 120 to identify or distinguish various inputs detected by sensors 110*a*, 110*b* and to initiate one or more actions (e.g., activating motor assembly 140, initiating a low or high volume flush, etc.) based on such inputs. Measurement values $z_1$ and $z_2$ may be sensor readings indicating a distance between a detected object and the first sensor, a velocity of the detected object relative to the first sensor, or any other indicator of an object (e.g. a user's hand or forearm or an electromagnetic field-absorbing object) moving into the first sensor's detection region. Time values $t_1$ and $t_2$ may be data values indicating a time at which a measurement value is measured. In some embodiments, system 100 detects an object with a first projected capacitive sensor and a first time value $t_1$ and a first measurement value $z_1$ are recorded (step 802). The first measurement $z_1$ is compared to a first threshold value (step 804). The object is detected with a second projected capacitive sensor and a second time value $t_2$ and a second measurement value $z_2$ are recorded (step 806). The second measurement value is compared with a second threshold value (step 808). The difference between the first time value and the second time value is compared with a time threshold (step 810). It is determined if an object was detected within a detection region. An estimate of a user gesture is determined based on the time and measurement values (step 812). Depending on which gesture is estimated, a corresponding action is initiated (step 814). For example, if a "left-to-right" wave of the user's had is estimated, a long flush may be imitated. If a "right-to-left" wave is estimated, a short flush may be initiated. In some embodiments, a high resolution detection scheme may be implemented with multiple projected capacitance sensors. Gestures may be detected including movements horizontally, vertically, diagonally, in circles, etc. corresponding actions may include a low volume flush, initiating a high volume flush, dispensing a sanitizer or deodorant, initiating a cleaning process, raising or lowering a seat or lid, etc.

Figure 8:
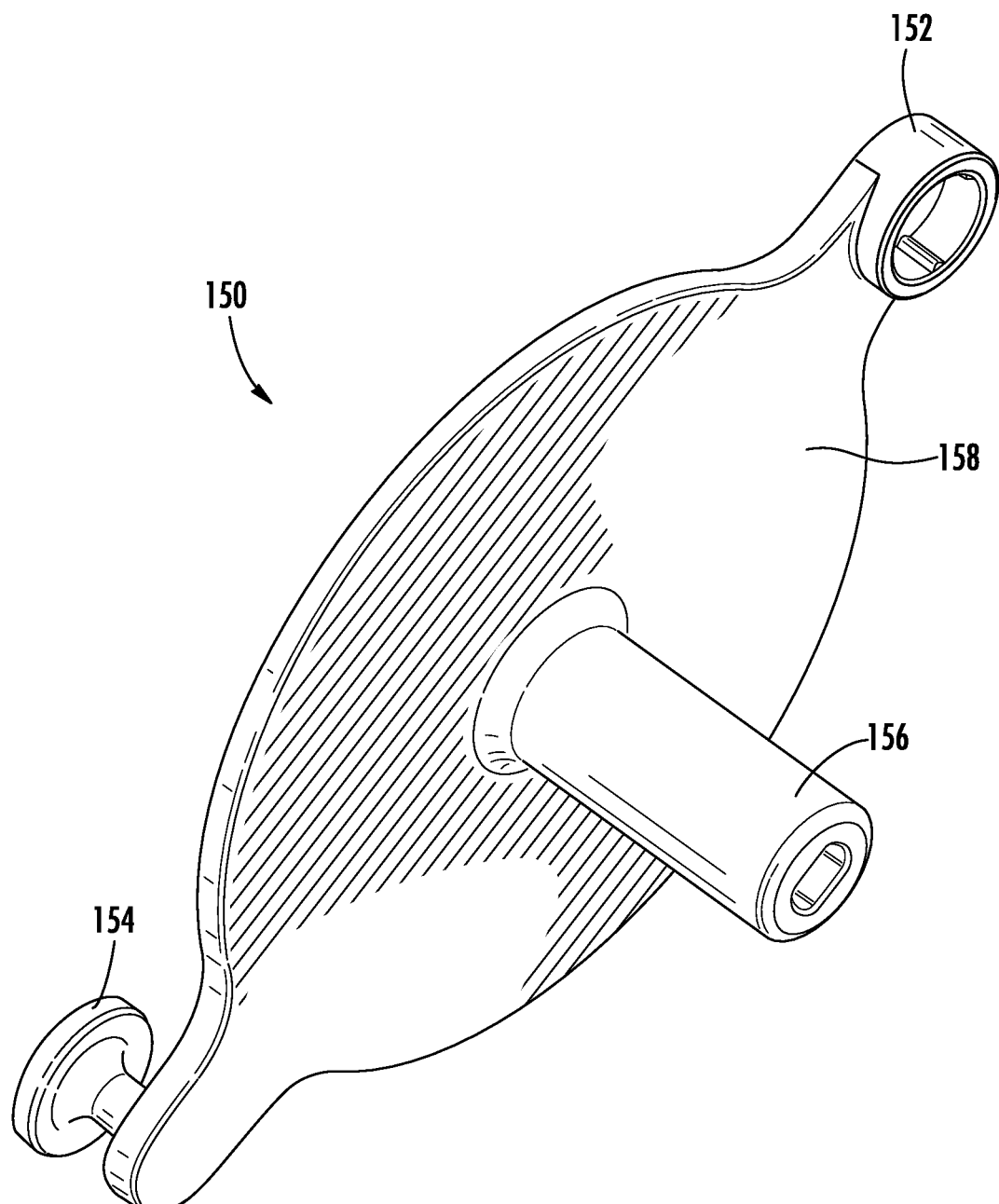
FIG. 8 is a drawing illustrating a perspective view of a wheel assembly used to actuate flushing of the toilet, according to an exemplary embodiment.

Referring now to FIG. 8, a detailed view of wheel assembly 150 is shown, according to an exemplary embodiment. Wheel assembly 150 is shown to include a circular disc 158 (i.e., a wheel), an axial connection 156, a linking element 154, and a magnet 152. Circular disc 158 may be coupled to a shaft of motor assembly 140 via axial connection 156. Wheel assembly 150 may be located outside of housing 102 and may be configured to rotate about axial connection 156 in response to processing circuit 120 activating motor assembly 140.

Linking element 154 may be configured to attach to a flush valve (e.g., a flapper, canister-style seal, etc.) via a linking chain or other coupling means such that rotation of wheel assembly 150 actuates flushing of the toilet (e.g., by lifting the flapper or seal covering a water outlet at the bottom of the reservoir). In some embodiments, the link between linking element 154 and the flush valve may be a direct link (e.g., without additional intermediate components). Advantageously, a direct link wheel assembly 150 and the flush valve may assist in adapting system 100 for use with a variety of different toilet models having a plurality of reservoir configurations. In other words, a wide variety of existing toilets may be retrofit with system 100 to include a touchless flush feature.

In other embodiments, wheel assembly 150 may be replaced with a rotatable lever or arm coupled to a shaft of motor assembly 140. The lever or arm may be configured to pivot in response to processing circuit 120 activating motor assembly 140. The lever or arm may include a linking element analogous to linking element 154 configured to attach to a flush valve (e.g., a flapper, canister-style seal, etc.) via a linking chain or other coupling means such that pivoting of the lever or arm actuates flushing of the toilet (e.g., by lifting the flapper or seal covering a water outlet at the bottom of the reservoir).

Wheel assembly 150 is shown to further include a magnet 152. Magnet 152 may be positioned on circular disc 158 such that rotation of wheel assembly 150 causes magnet 152 to rotate about axial connection 156. In some embodiments, processing circuit 120 may be configured to detect when wheel assembly 150 has completed one full rotation and may deactivate motor assembly 140 when one full rotation is detected. Magnet 152 may assist processing circuit 120 in determining when wheel assembly 150 has completed one full rotation. For example, referring again to FIG. 7A, system 100 may include a reed switch 160 communicably connected to processing circuit 120. Reed switch 160 may be included as a circuit component of processing circuit 120 or may communicate with processing circuit 120 from outside processing circuit 120. Reed switch 160 may be positioned within housing 102 such that magnet 152 triggers reed switch 160 once wheel assembly 150 has completed one full rotation.

Processing circuit 120 may be configured to receive a signal from reed switch 160 and deactivate motor assembly 140 based on said signal. In some embodiments, motor assembly 140 may be allowed to drift into a desired rotational position. In other embodiments, processing circuit 120 may employ a motor control topology that ensures repeatable positional control. For example, processing circuit 120 may actively break motor assembly 140 by shorting electrical leads to motor assembly 140 when reed switch 160 is triggered by magnet 152. The motor control topology may also include feedback loop control, back emf sensors, open loop control, embedded processors, integrated circuits, etc. Repeatable positional control may be used to ensure that motor assembly 140 and wheel assembly 150 are stopped in a desired position notwithstanding the possibility of a variable voltage delivered by power supply 130 (e.g., partially depleted batteries). In some embodiments, processing circuit 120 may be configured to activate motor assembly 140 such that the flush valve is maintained in the open position for a length of time estimated to ensure a complete flush of the toilet. Motor control topology may be employed to ensure a complete flush and avoid premature closing of the flush valve. In some embodiments processing circuit 120 may be configured to activate motor assembly 140 such that a full rotation of wheel assembly 150 occurs in an amount of time required to ensure that the flush valve is held open for an adequate amount of time. Processing circuit 120 may activate motor assembly 140 such that the rotational speed of wheel assembly 150 is slow or fast enough to achieve a complete flush.

In some embodiments, processing circuit 120 may be configured to rotate wheel assembly 150, pause while the flush valve is held open, and return wheel assembly 150 to its initial position. The pause may be based upon a fixed pause time value (e.g. two seconds) or a programmed pause time value specific to the application, or otherwise determined by the user of system 100 (e.g. set by a signal received by communications interface 170). In some embodiments, the user of system 100 may select a pause time value by manipulating switches included in system 100. For example, dipswitches or other switches may be configured to alter the pause time value.

In some embodiments, a cam may be used to ensure the flush valve is held open for a determined pause time value. The pause time value may be altered by selecting cams of varying profiles. The pause time value may also be altered through a combination of the cam profile and the rotational speed of wheel assembly 150. The rotational speed of wheel assembly 150 may be altered according to user input or be predetermined.

In some embodiments, a stepper motor may be used to control the rotation of wheel assembly 150. The stepper motor may be used in conjunction with processing circuit 120 and/or motor control topology. The stepper motor may also be used in conjunction with a combination of user defined pause time values, predetermined pause time values, cams, etc. The stepper motor may achieve a desired rotational speed. The stepper motor may also be used to pause at a desired rotational position for a pause time value.

Figure 9A:
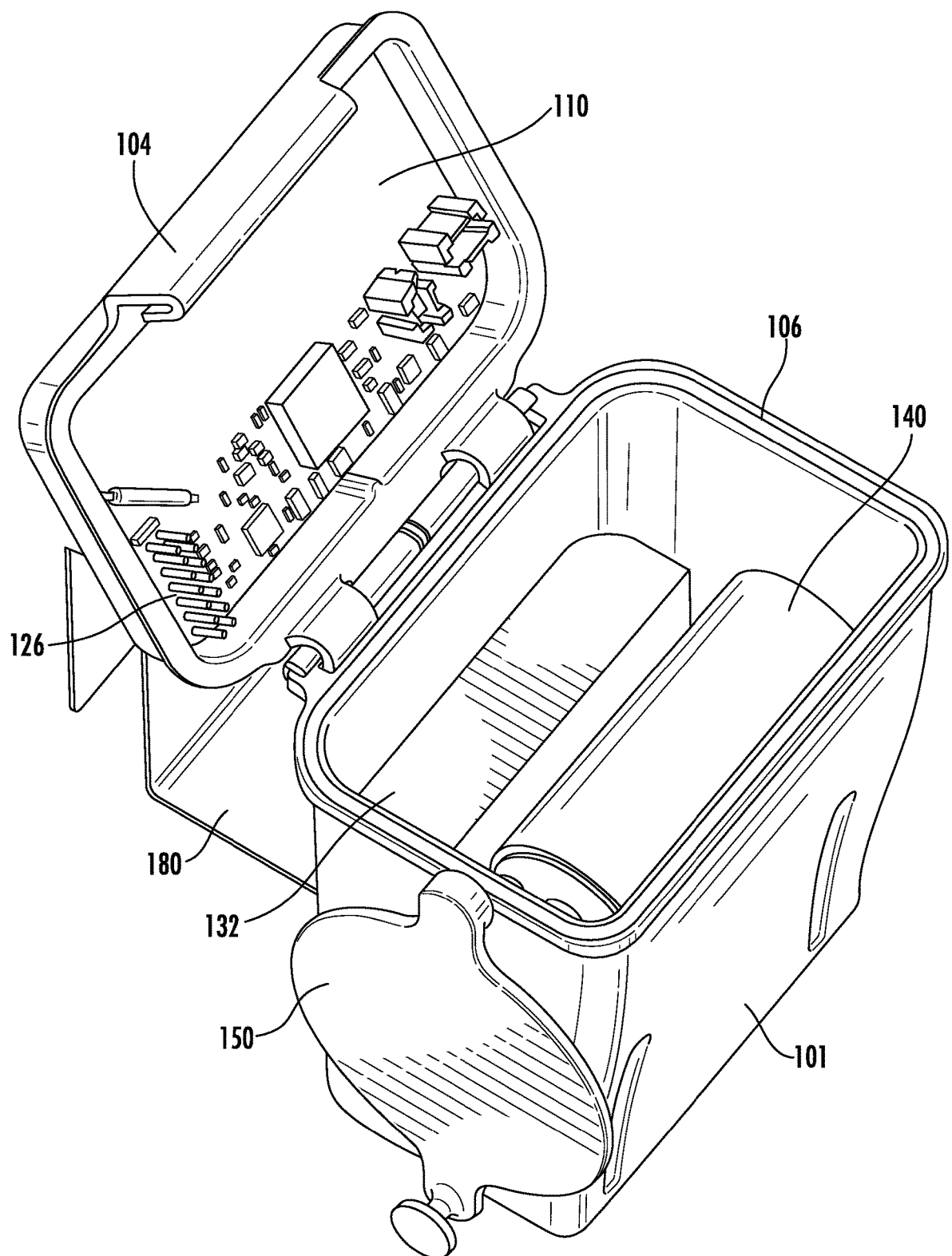
FIG. 9A is a drawing of the touchless actuation system of FIG. 1A with the cover open showing the internal components, according to an exemplary embodiment.

Referring now to FIG. 9A, an internal view of system 100 is shown, according to an exemplary embodiment. Additional components of system 100 shown in FIG. 9 include a power supply enclosure 132 for containing power supply 130 and a housing seal 106. Power supply enclosure 132 may hold, support, or contain power supply 130. Power supply enclosure 132 may provide electric leads connecting power supply 130 with motor assembly 140. In some embodiments, enclosure 132 may include a voltage converter, AC/DC converter, or other power processing component.

Seal 106 may be a perimeter seal around the opening in shell 101. In some embodiments, seal 106 may be configured to fit within channel 108 along an upper perimeter of housing 102. Seal 106 may assist housing 102 and cover 104 in providing a water-resistant or waterproof and/or contamination proof barrier when cover 104 is in the closed position. Seal 106 may prevent water from the toilet reservoir from leaking into housing 102 and potentially damaging the electric components of system 100.

Figure 9B:
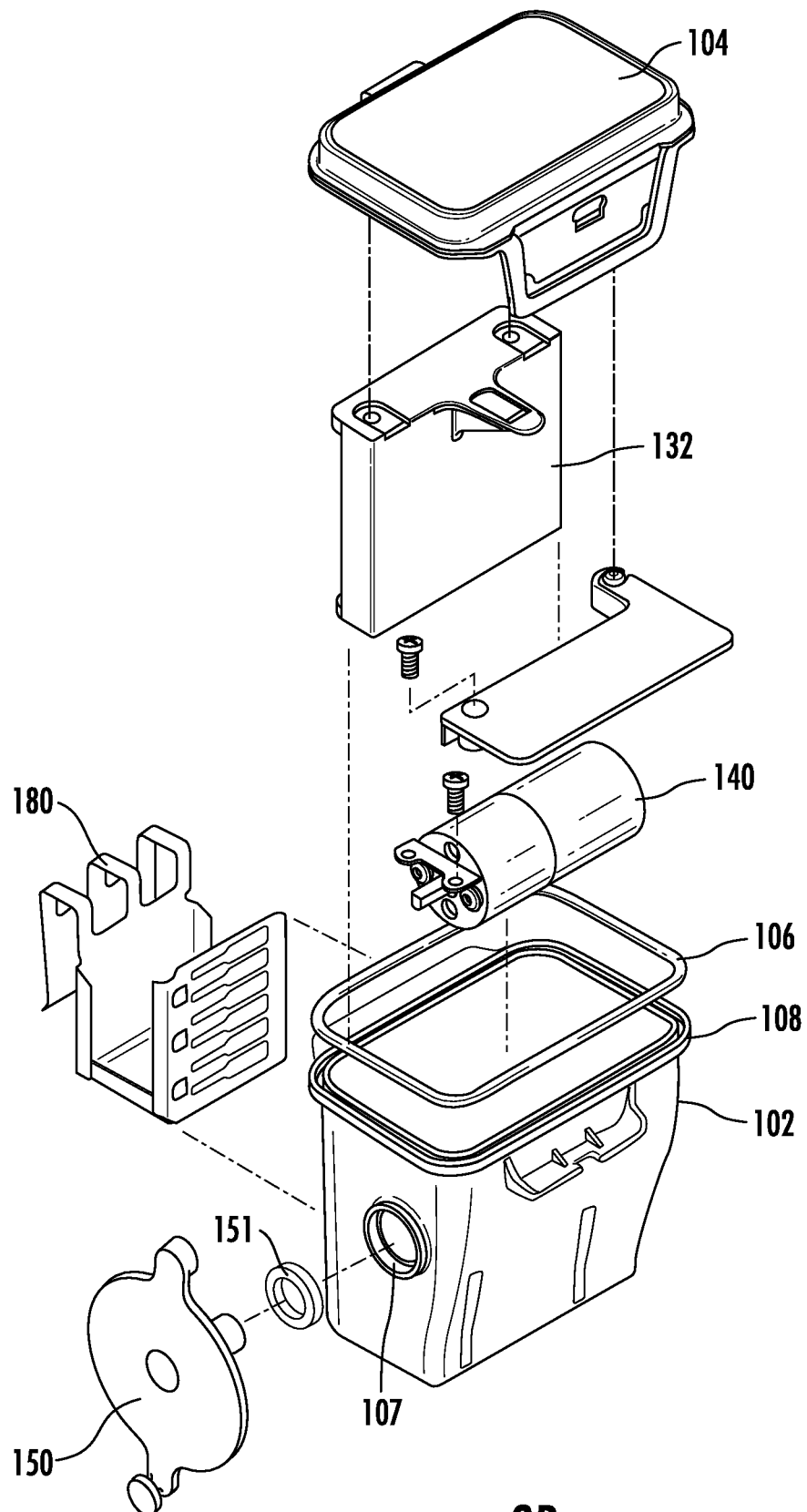
FIG. 9B is a drawing illustrating an exploded view of the touchless actuation system of FIG. 1B, according to an exemplary embodiment.
Figure 9C:
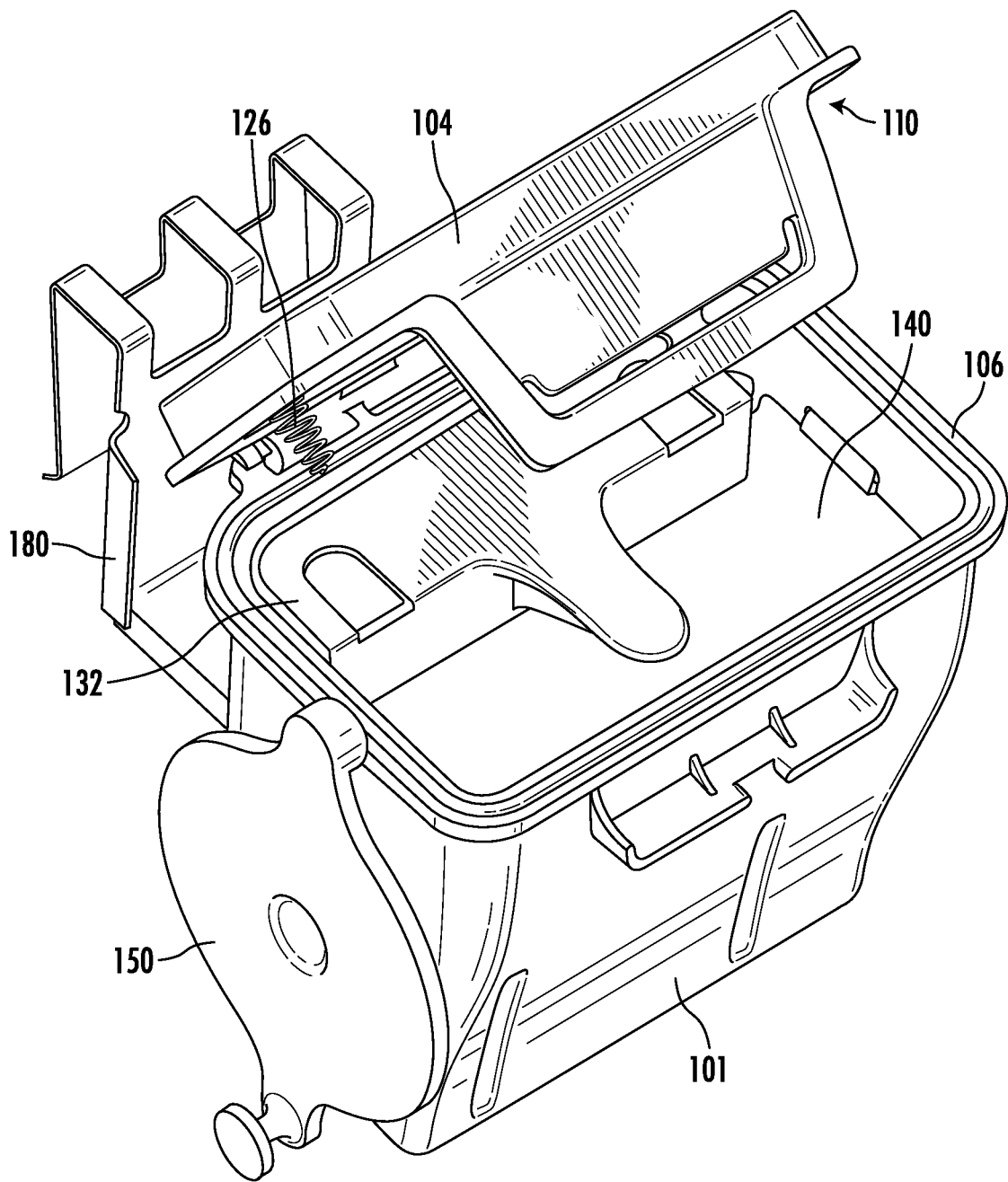
FIG. 9C is a drawing of the touchless activation system of FIG. 1A with the cover open showing the internal components, according to an additional embodiment.
Figure 10A:
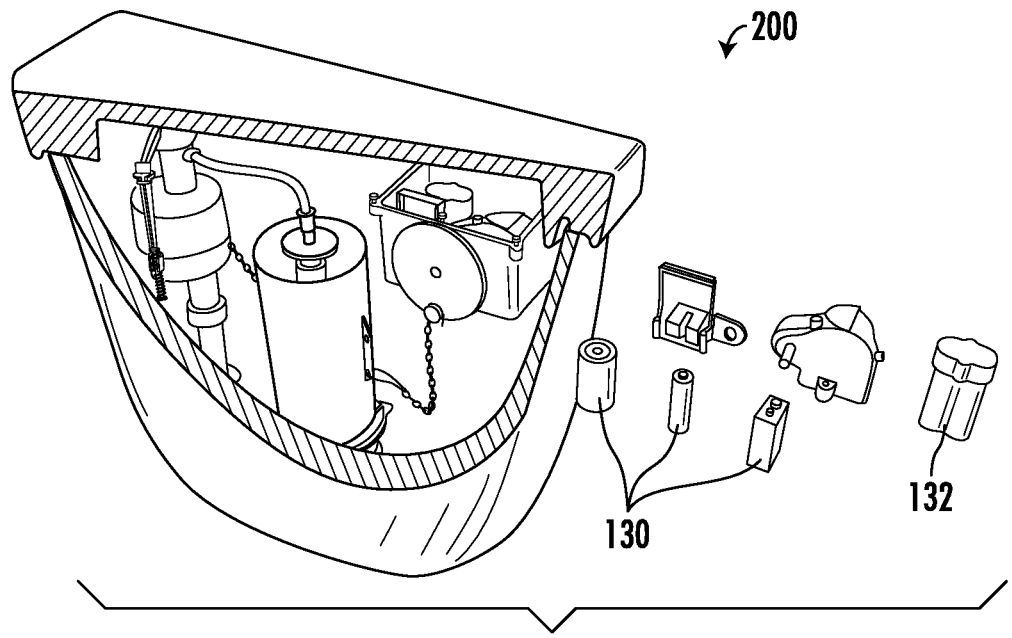
FIG. 10A illustrates a first alternate configuration of a touchless actuation system using an alternate mounting bracket and electronics configuration, according to an exemplary embodiment.
Figure 10B:
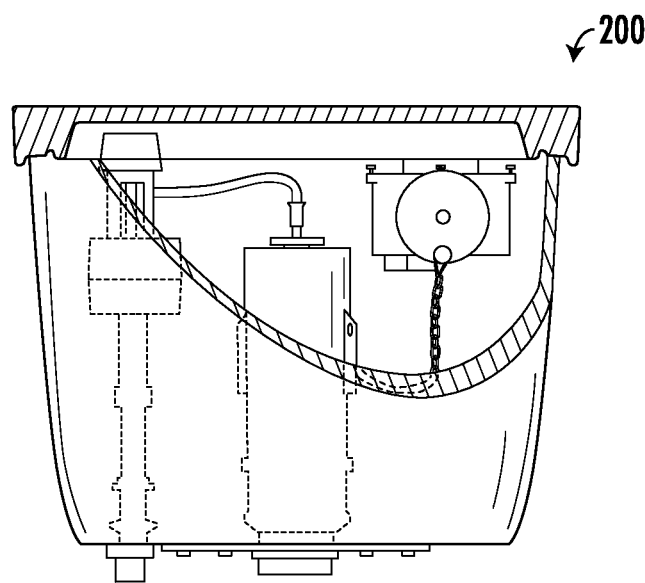
FIG. 10B illustrates the alternative configuration of FIG. 10A from a side view and without an exploded view.
Figure 10C:
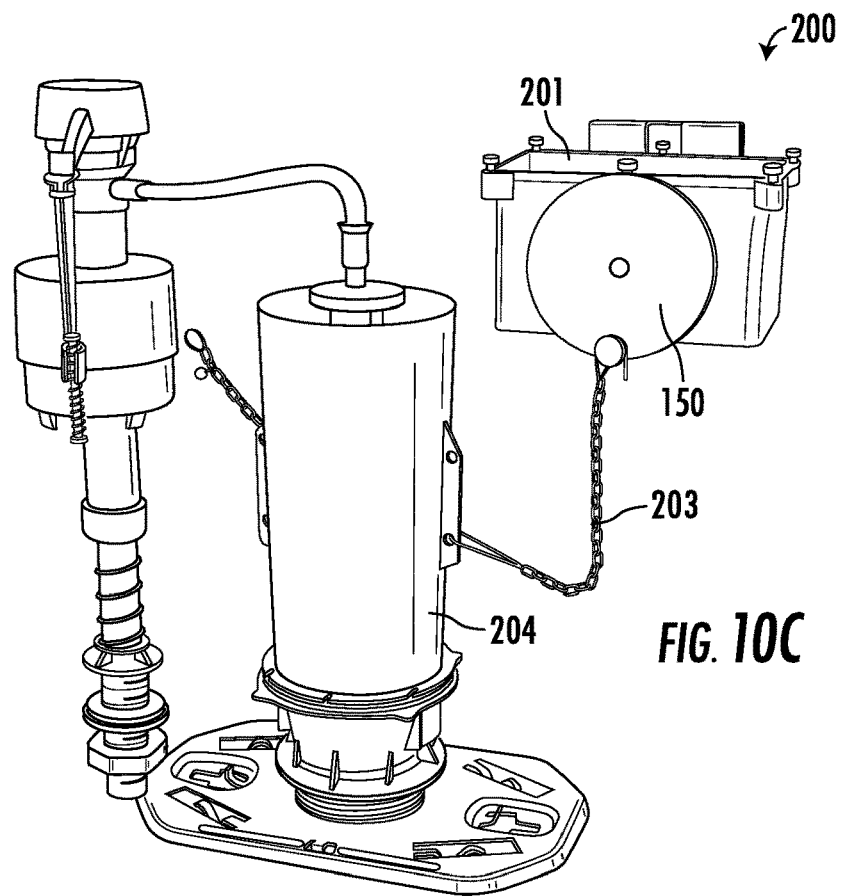
FIG. 10C illustrates the alternative configuration of FIG. 10A without a reservoir.
Figure 10D:
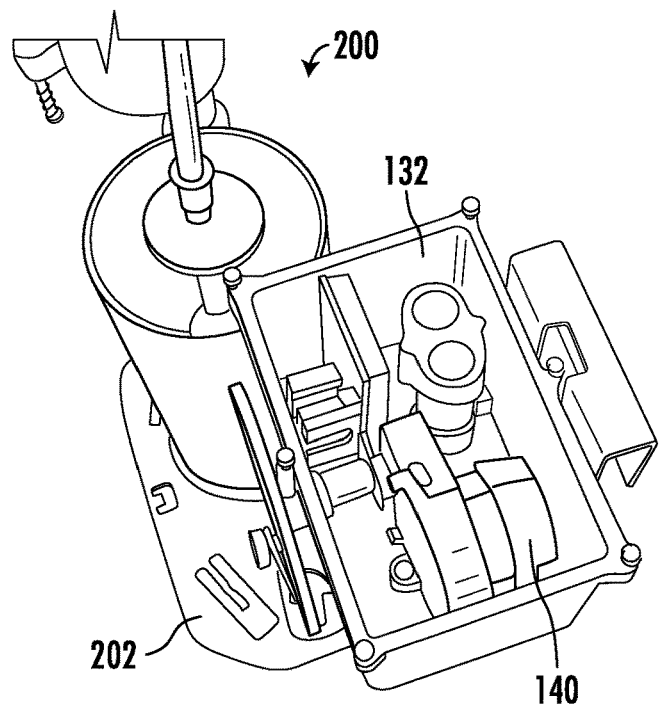
FIG. 10D illustrates the alternative configuration of FIG. 10A with attention on the interior of housing and the components therein.
Figure 11A:
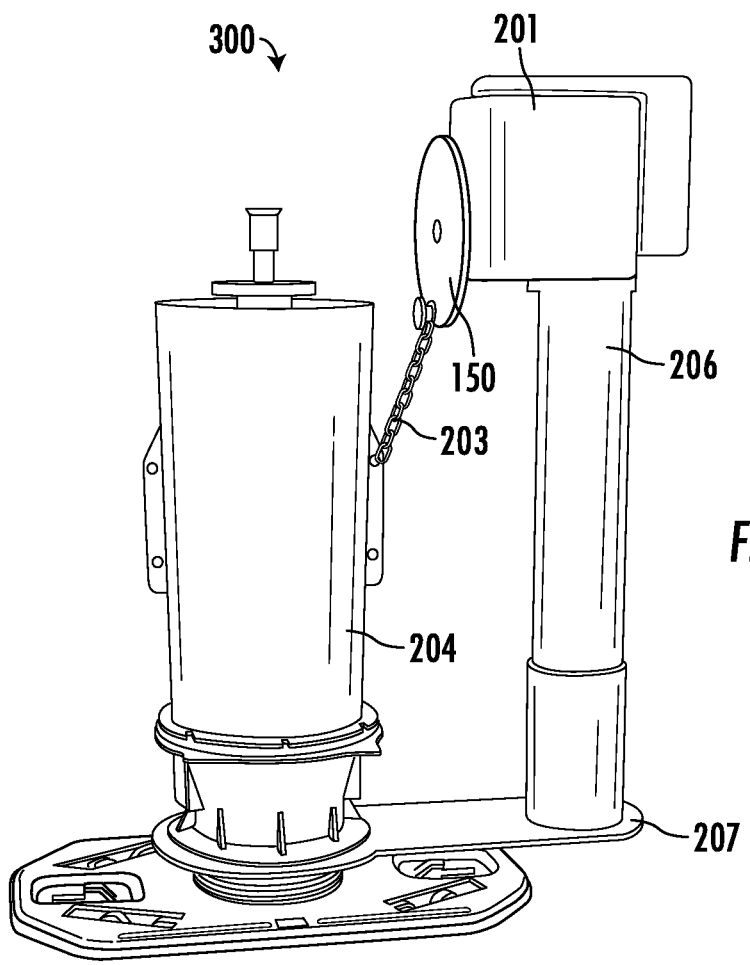
FIG. 11A illustrates a second alternate configuration of a touchless actuation system using a pivoting sensor body supported by a hollow stem coupled to an existing flush valve, according to an exemplary embodiment.
Figure 11B:
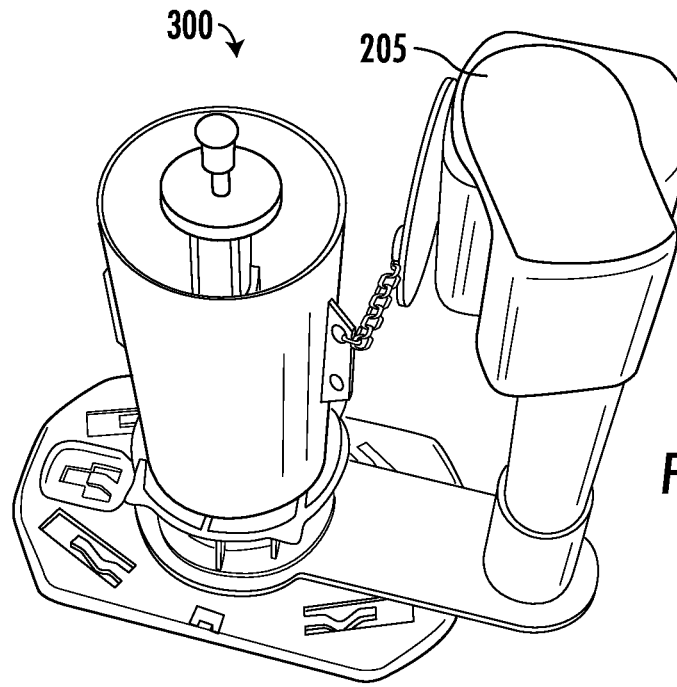
FIG. 11B illustrates the alternative configuration of FIG. 11A showing the pivoting sensor body.
Figure 11C:
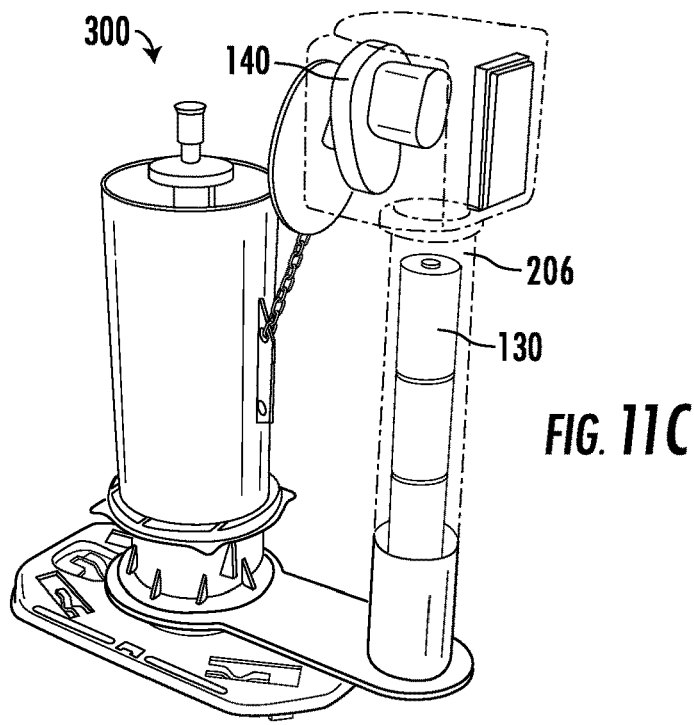
FIG. 11C illustrates the alternative configuration of FIG. 11A with an internal view of the system.
Figure 11D:
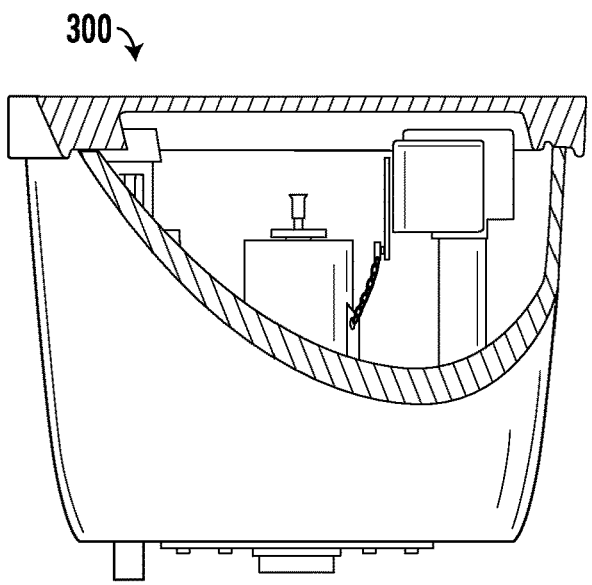
FIG. 11D illustrates the alternative configuration of FIG. 11A relative to a toilet reservoir.
Figure 11E:
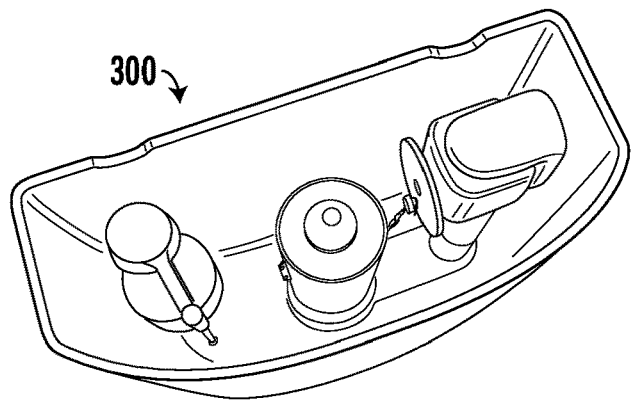
FIG. 11E illustrates the alternative configuration of FIG. 11A positioned within a toilet reservoir with an overhead view.
Figure 12A:
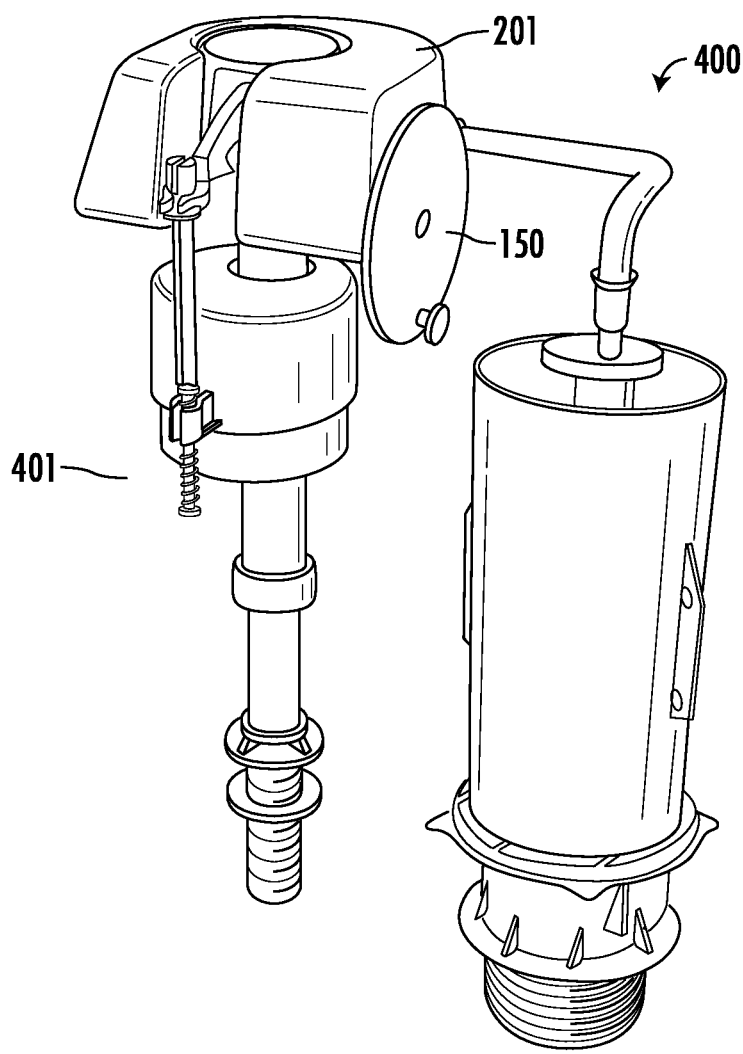
FIG. 12A illustrates a third alternate configuration of a touchless actuation system using a compact sensor package supported by an existing fill valve in the reservoir, according to an exemplary embodiment.
Figure 12B:
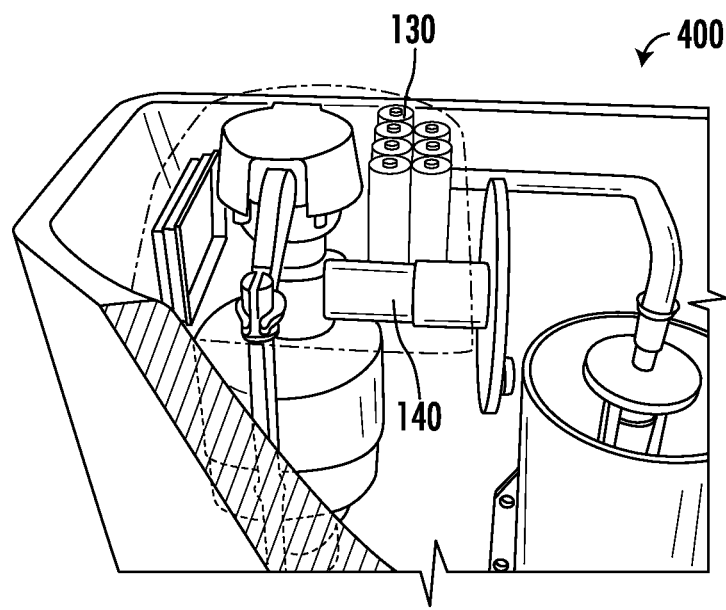
FIG. 12B illustrates the alternative configuration of FIG. 12A with a view showing the components within the housing.
Figure 12C:
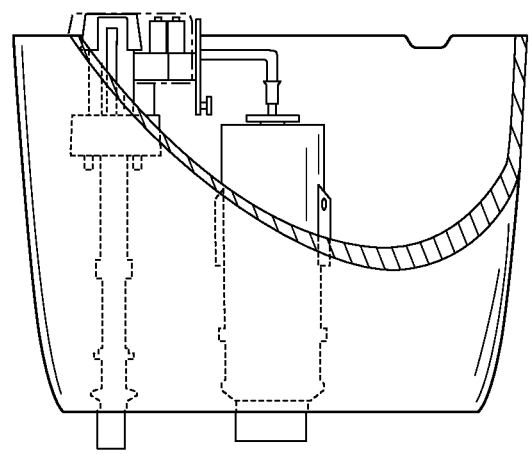
FIG. 12C illustrates the alternative configuration of FIG. 12A with an internal view of the housing and as the system is positioned within the reservoir.
Figure 12D:
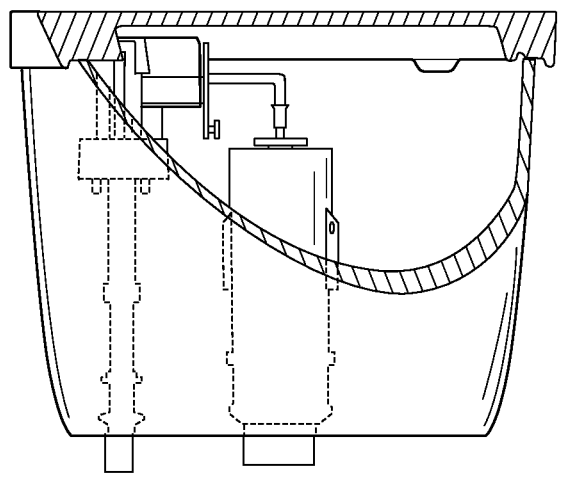
FIG. 12D illustrates the positioning within the reservoir of the alternative configuration depicted in FIG. 12A.
Figure 12E:
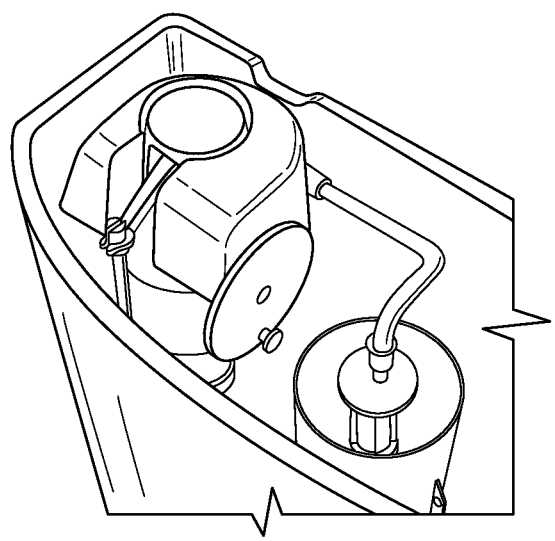
FIG. 12E illustrates the positioning within the reservoir of the alternative configuration depicted in FIG. 12A according to an isometric view.
Figure 13A:
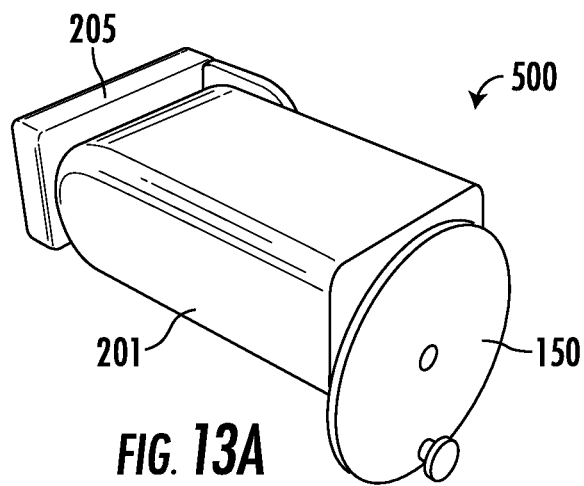
FIG. 13A illustrates a fourth alternate configuration of a touchless actuation system in which the sensor electronics package is vertically rotatable, according to an exemplary embodiment.
Figure 13B:
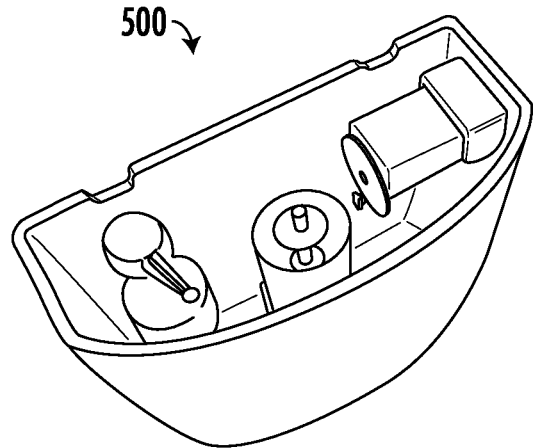
FIG. 13B illustrates the alternative configuration of FIG. 13A with the sensor body positioned to create a detection region above the lid of the reservoir.
Figure 13C:
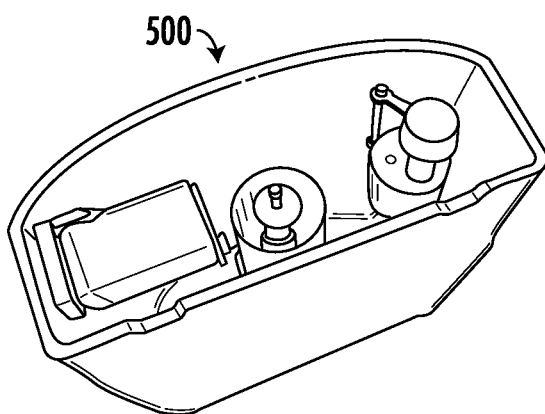
FIG. 13C illustrates the alternative configuration of FIG. 13A with the sensor body positioned to create a detection region along one side of the reservoir.
Figure 13D:
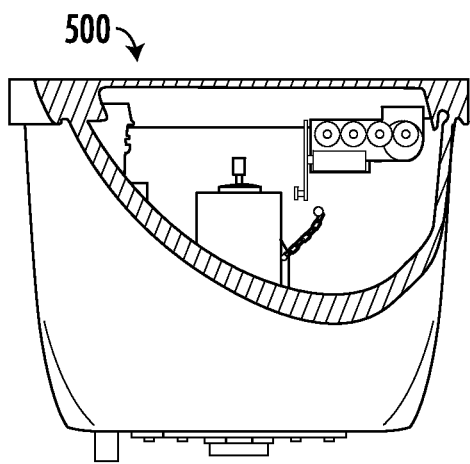
FIG. 13D illustrates a cutaway view of the alternative configuration of FIG. 13A.
Figure 13E:
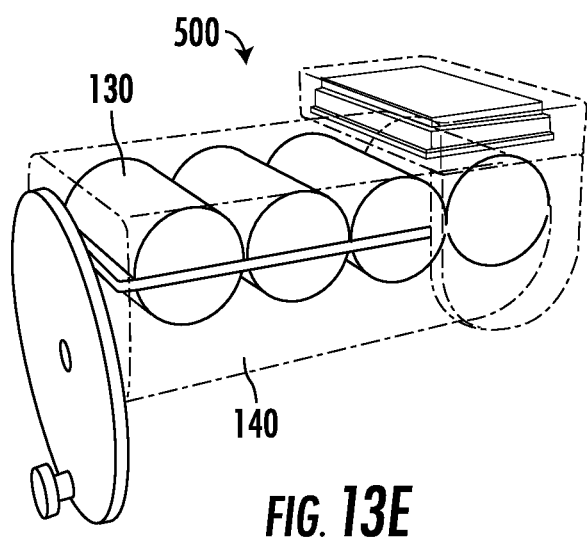
FIG. 13E illustrates the components within the housing of the alternative configuration of FIG. 13A.
Figure 13F:
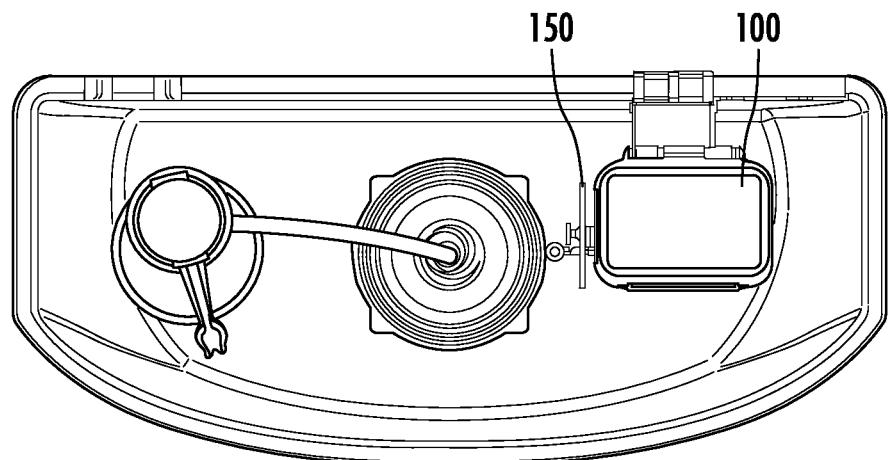
FIG. 13F illustrates a top view of an embodiment of a touchless activation system in relation to a toilet reservoir, according to an exemplary embodiment.
Figure 13G:
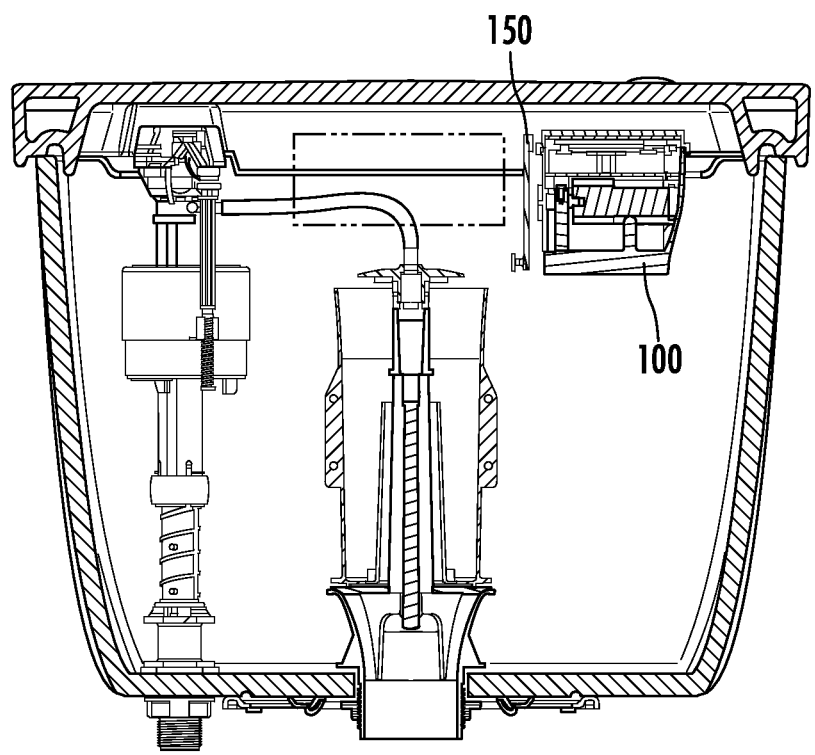
FIG. 13G illustrates a side view of an embodiment of a touchless activation system in relation to a toilet reservoir, according to an exemplary embodiment.
Figure 13H:
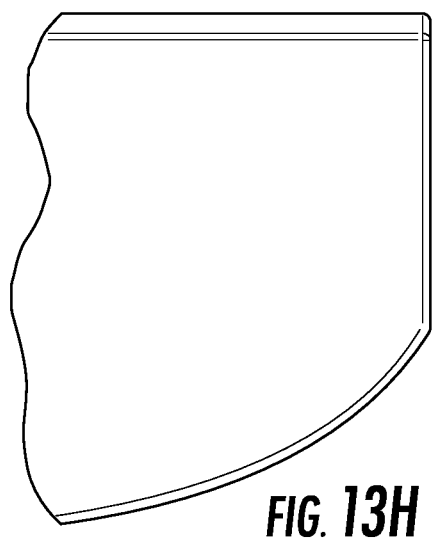
FIG. 13H illustrates a top view of the opaque lid of an embodiment of a touchless activation system in relation to a toilet reservoir, according to an exemplary embodiment.
Figure 13I:
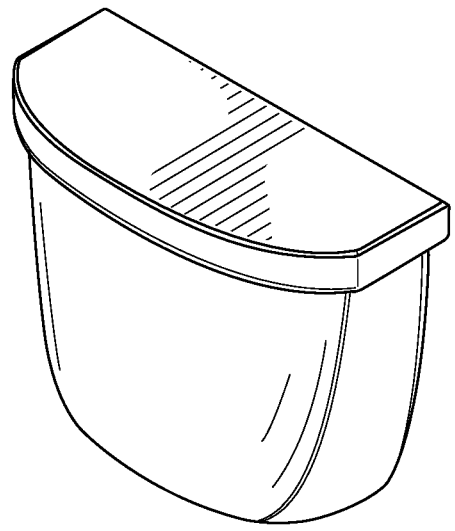
FIG. 13I illustrates an isometric view of the opaque reservoir of an embodiment of a touchless activation system in relation to a toilet reservoir, according to an exemplary embodiment.
Figure 13J:
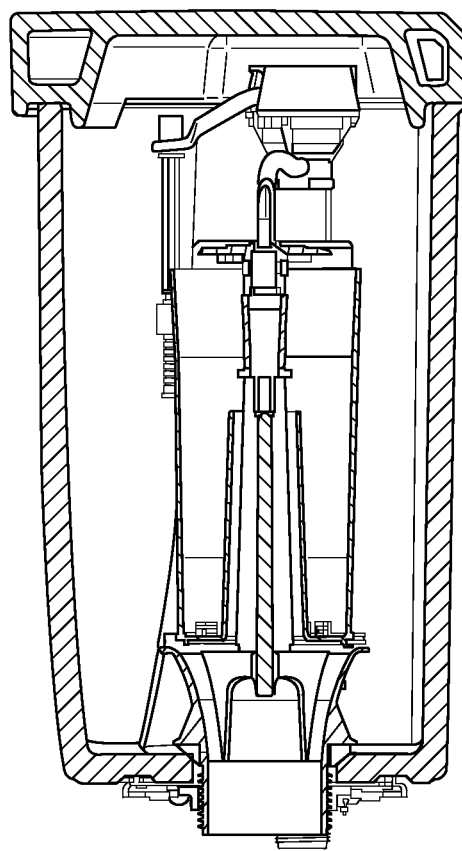
FIG. 13J illustrates a side view of an embodiment of a touchless activation system in relation to a toilet reservoir, according to an exemplary embodiment.

Still referring to FIG. 9A, in some embodiments, the PCB including processing circuit 120 may be located in cover 104. Sensor 110, reed switch 160, and/or communications interface 170 may also be located in cover 104. Motor assembly 140 and power supply enclosure 132 are shown positioned inside housing 102. In some embodiments, electrical leads 126 (e.g., prongs, wires, terminals, adapters, springs, etc.) may connect the electrical components of system 100 located in cover 104 with motor assembly 140 and power supply 130. FIG. 9B shows an exploded view of the system 100 shown in FIG. 1B. Included in the exploded view are housing seal 106 which sits in housing channel 108 to help provide a water proof or water resistant and/or contaminant proof barrier for system 100. O-ring 151 is used to provide the barrier for system 100 by forming a barrier in conjunction with wheel assembly 150 and port 107. FIG. 9C shows an internal view of an additional embodiment similar to the embodiment shown in FIG. 9A.

Referring now to FIGS. 10A-D, a first alternate configuration 200 of a touchless capacitive actuation system is shown, according to an exemplary embodiment. Configuration 200 may include a main package 201 including processing electronics 202, a motor assembly 140 which may include a gearbox, and a power supply enclosure 132 within the main package. The main package may be installed (e.g., mounted on a side wall) inside a toilet reservoir and may be completely concealed within the reservoir when a reservoir lid covers the reservoir.

Processing electronics 202 may include a processing circuit having a processor and memory as described in reference to FIG. 7A. The processing electronics may further include a projected capacitive sensor configured to protect an electromagnetic field through the reservoir and into a detection region outside the reservoir. The processing electronics may be configured to receive a signal from the sensor and activate the motor and gearbox based on said signal. Power supply enclosure 132 may supply power to the motor and gearbox and may use various types of batteries including AA, AAA, C, D, 12-volt, and 9-volt as power supply 130.

Configuration 200 may further include a wheel assembly 150 coupled to a chain 203 which is directly connected to a flush valve 204. The motor and gearbox may cause the wheel assembly to rotate when activated by the processing electronics, thereby lifting the flush valve via the chain. The chain connected to the wheel assembly may supplement or replace another actuation mechanism such as a traditional handle, a solenoid, a lever, or another automatic flushing mechanism.

Referring now to FIG. 11A-E, a second alternate configuration 300 of a touchless capacitive actuation system is shown, according to an exemplary embodiment. In configuration 300, the main package 201 (e.g., a projected capacitive sensor, a processing circuit, and a motor assembly) may be located within a pivoting sensor body 205. The main package 201 may be supported by a hollow stem 206 which fits into a stem support element 207 coupled to the flush valve 204. A power supply 130 (e.g., one or more batteries) may be located within the hollow stem 206 for supplying power to the main package. The sensor may be positioned on a side of the main package and may project an electromagnetic field into a detection region in front of the reservoir or to a side of a reservoir. The sensor direction may be adjusted via rotation of the pivoting sensor body 205. The motor assembly 140 may be connected to a wheel assembly 150. Rotation of the wheel assembly 150 may pull a chain 203 connected to a flush valve 204, thereby actuating flushing of the toilet.

Referring now to FIG. 12A-E a third alternate configuration 400 of a touchless capacitive actuation system is shown, according to an exemplary embodiment. In configuration 400, the main package 201 (e.g., a projected capacitive sensor, a processing circuit, and a motor assembly) is contained within a compact enclosure supported by an existing fill valve 401 within the reservoir. Advantageously, the compact design and minimal hardware of configuration 400 may be compatible with a large percentage of existing toilet models. Thereby existing toilets may work in conjunction with configuration 400, or another embodiment referenced herein, to operate with a concealed touchless capacitive sensor.

Referring now to FIG. 13A-E, a fourth alternate configuration 500 of a touchless capacitive actuation system is shown, according to an exemplary embodiment. In configuration 500, the sensor electronics package (e.g., a projected capacitive sensor and a processing circuit) is contained within a pivoting sensor body 205. The pivoting sensor body 205 may rotate about the main package 201 (e.g., the gearbox, motor, and power supply). The pivoting sensor body may allow the orientation of the sensor to be adjusted between a first position in which the sensor is oriented upward and a second position in which the sensor is oriented downward. Advantageously, depending on the mounting position of the main package 201, the detection region defined by the sensor may be customized to emanate from the reservoir in nearly any direction. In some embodiments, the pivoting sensor body may rotate about the main package at least 180 degrees.

FIG. 13F-J shows an additional embodiment of system 100, as placed within a toilet reservoir, from multiple views. System 100 is attached to the rear vertical surface of the reservoir with positioning bracket 180. The detection region is located above the opaque lid of the reservoir. The components of system 100 are hidden from view.

Figure 14:
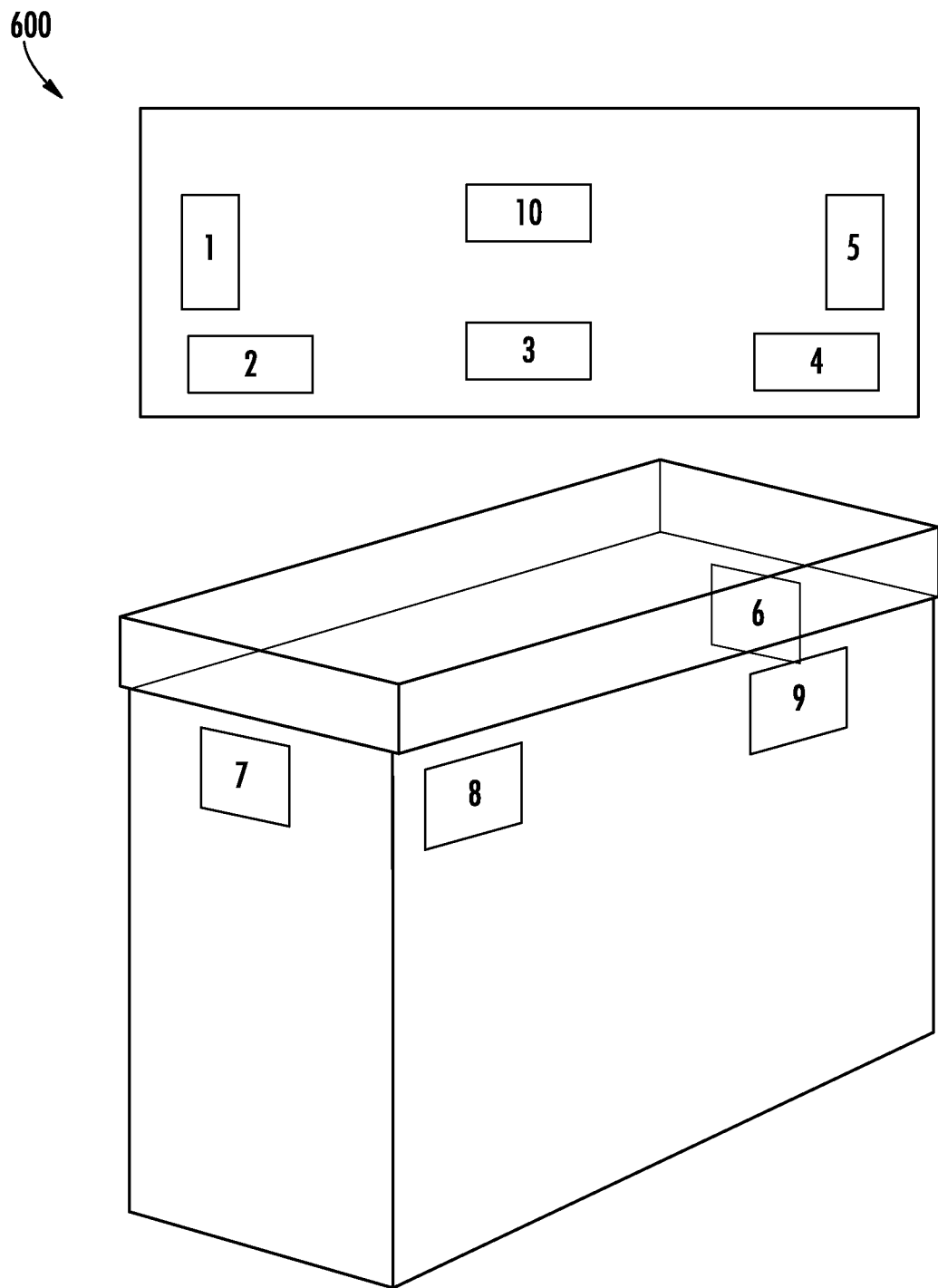
FIG. 14 is a drawing illustrating a variety of optional sensor locations, according to varying exemplary embodiments.

Referring now to FIG. 14, drawing 600 illustrates many possible sensor positions and orientations according to an exemplary embodiment. Drawing 600 depicts six sensor locations (e.g., locations 1-5, and 10) in which the electromagnetic field projected by the projected capacitive sensor is directed upward through a lid of the reservoir. Drawing 600 also depicts four sensor locations (e.g., locations 6-9) in which the electromagnetic field projected by the projected capacitive sensor is directed horizontally through a front or side wall of the reservoir.

Figure 15:
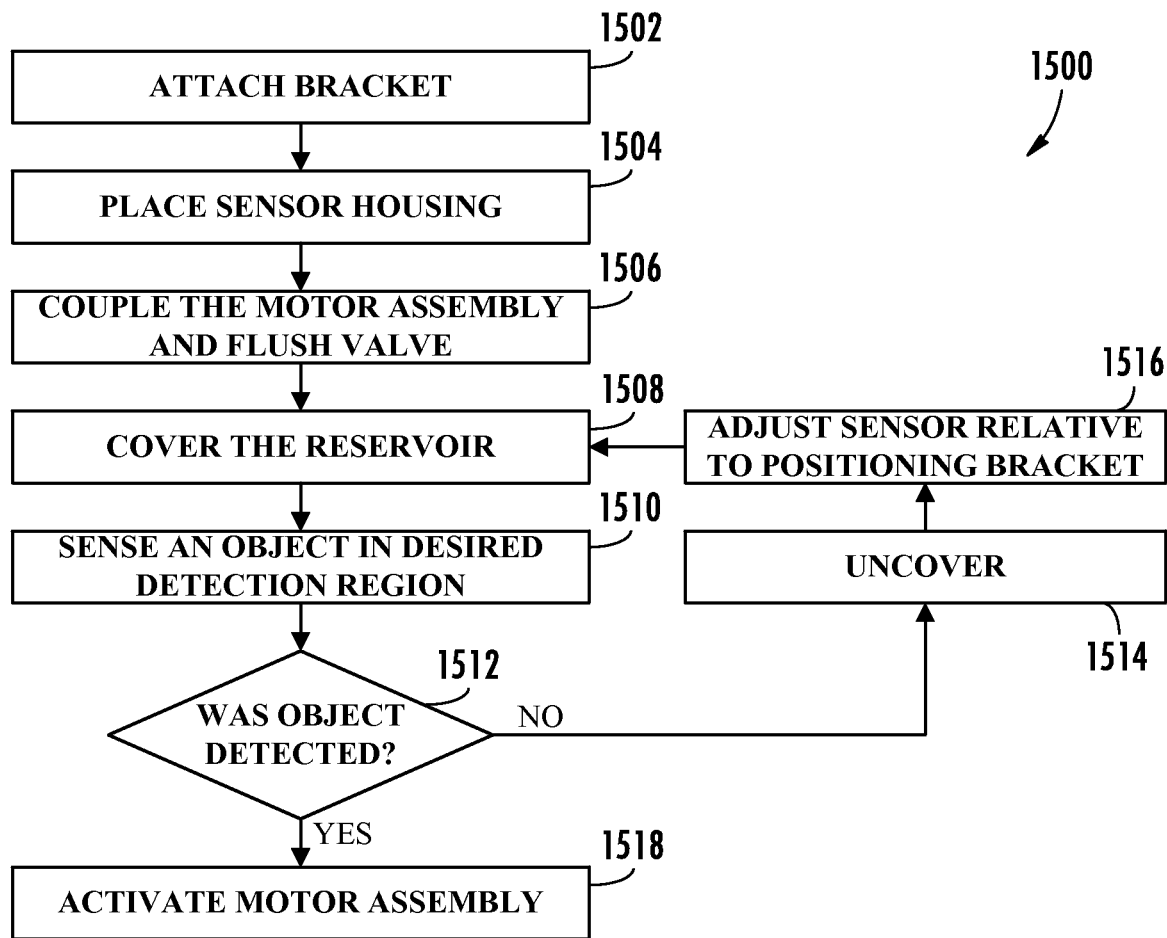
FIG. 15 is a flowchart illustrating how a toilet may be retrofit with an improved touchless flushing system embodiment.

Now referring to FIG. 15, a flowchart is illustrated showing the process 1500 for retrofitting an existing toilet with an improved touchless flushing system embodiment. First a positioning bracket is attached inside a toilet reservoir (step 1502). A projected capacitive sensor, a motor assembly, and a processing circuit are placed within the toilet reservoir (step 1504). In some embodiments, the projected capacitive sensor, motor assembly, and processing circuit are within a housing attached to the positioning bracket. In other embodiments, one or more components may be located apart from the others and connected to them. One or more components may be located outside the reservoir. At least the projected capacitive sensor is attached to the positioning bracket. The projected capacitive sensor (i.e. housing sensor) is positioned relative to the positioning bracket to define a detection region in relation to the toilet reservoir. The motor assembly is coupled to a flush valve (step 1506). The toilet reservoir is covered (step 1508). The projected capacitive sensor may lack an optical path to the detection region. An object is sensed in the detection region (step 1510). This step entails passing an object above through the desired detection zone. If the object is detected (step 1512) the motor assembly will be activated by the processing circuit (step 1518) and the toilet will be flushed in response to the signal from the projected capacitive sensor. If the object passed through the desired detection zone in the "sense an object in desired detection region" step is not detected, the positioning of the projected capacitive sensor must be adjusted. In this case, the reservoir is uncovered (step 1514). Then, the sensor position is adjusted relative to the positioning bracket (step 1516). The reservoir is covered (step 1508). An object is passed through the desired detection region (step 1510). If the object is detected (step 1512), the motor assembly is activated by the processing circuit (step 1512). If the object is not detected, then the iteration begins again, and the sensor's position relative to the positioning bracket is changed again.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A touchless actuation system for a toilet comprising:
   a touchless sensor located within a closed reservoir of the toilet, the closed reservoir comprising a bottom and at least one wall extending upward therefrom;
   a motor assembly;
   a processing circuit configured to receive a signal from the touchless sensor and to detect an object within a detection region based on the signal, the detection region being external to the closed reservoir; and
   a housing within which the touchless sensor, the motor assembly, and the processing circuit are contained, the housing coupled to the at least one wall of the closed reservoir;
   wherein the processing circuit is configured to facilitate flushing of the toilet through interaction with the motor assembly when the object is detected.

2. The touchless actuation system of claim 1, wherein the touchless actuation system is completely concealed within the closed reservoir for the toilet.

3. The touchless actuation system of claim 1, wherein the closed reservoir is optically opaque.

4. The touchless actuation system of claim 1, wherein:
   the processing circuit is configured to activate the motor assembly upon detecting the object; and
   the motor assembly is configured to actuate flushing of the toilet when activated by the processing circuit.

5. The touchless actuation system of claim 1, wherein:
   the touchless sensor projects an electromagnetic field through a surface of the closed reservoir; and
   the electromagnetic field defines the detection region.

6. The touchless actuation system of claim 5, wherein:
   the surface of the closed reservoir is a lid of the closed reservoir; and
   the detection region is defined above the lid of the closed reservoir.

7. The touchless actuation system of claim 1, wherein:
   the object is a hand or forearm of a user; and
   the user may flush the toilet by moving the hand or forearm into the detection region without touching the toilet, the closed reservoir, or the touchless actuation system.

8. The touchless actuation system of claim 1, further comprising:
   a positioning bracket comprising a plurality of slots, the positioning bracket coupled to the closed reservoir; and
   a peg coupled to the housing and received within one of the plurality of slots to couple the housing to the closed reservoir.

9. The touchless actuation system of claim 4, further comprising a wheel assembly coupled to the motor assembly and configured to rotate when the motor assembly is activated;
   wherein the wheel assembly is configured to couple to a chain attached to a flushing mechanism within the closed reservoir;
   wherein rotation of the wheel assembly causes the chain to actuate the flushing mechanism; and
   wherein the chain is directly attached to a flush valve covering an outlet of the closed reservoir.

10. The touchless actuation system of claim 9, further comprising a switch;
    wherein the wheel assembly further comprises a magnet;
    wherein the processing circuit is configured to detect when the wheel assembly has completed one full rotation using the magnet and switch; and
    wherein the processing circuit is further configured to deactivate the motor assembly when one full rotation is detected.

11. The touchless actuation system of claim 4, further comprising a lever or arm coupled to the motor assembly and configured to rotate when the motor assembly is activated;
   wherein the lever or arm is configured to couple to a chain attached to a flushing mechanism within the closed reservoir; and
   wherein rotation of the lever or arm causes the chain to actuate the flushing mechanism.

12. The touchless actuation system of claim 1, wherein:
   the processing circuit is configured to estimate a gesture performed by a user and initiate one or more supplemental actions based on the estimated gesture; and
   the one or more supplemental actions include at least one of initiating a short flush, initiating a long flush, dispensing a deodorant, and initiating a cleaning process.

13. The touchless actuation system of claim 12, further comprising one or more additional touchless sensors;
   wherein the processing circuit is configured to estimate the gesture based on signals received from the one or more additional touchless sensors and the signals received from the touchless sensor.

14. A toilet, comprising:
   a touchless sensor;
   a motor assembly;
   a processing circuit configured to receive a signal from the touchless sensor and to activate the motor assembly based on the signal;
   a wheel assembly coupled to the motor assembly and configured to rotate when the motor assembly is activated, the wheel assembly comprising a magnet and a link;
   a switch configured to detect presence of the magnet and to transmit a deactivation signal to the processing circuit in response to detecting presence of the magnet;
   a closed reservoir configured to contain flush water and a flush valve and defined by a plurality of walls; and
   a housing within which the touchless sensor, the motor assembly, the switch, and the processing circuit are contained, the housing coupled to at least one of the plurality of walls of the closed reservoir such that the touchless sensor is located within the closed reservoir;
   wherein the touchless sensor is configured to transmit the signal to the processing circuit in response to detecting an object external to the closed reservoir;
   wherein activation of the motor assembly facilitates flushing of the toilet; and
   wherein the processing circuit is configured to deactivate the motor assembly based on the deactivation signal; and
   wherein the link is configured to be coupled to the flush valve.

15. The toilet of claim 14, wherein the closed reservoir is optically opaque.

16. The toilet of claim 14, wherein:
   the touchless sensor is configured to project an electromagnetic field through the closed reservoir;
   the electromagnetic field defines a detection region external to the closed reservoir;
   the signal is indicative of the presence of the object within the detection region; and
   the object is a hand or forearm of a user and the user is capable of selectively flushing the toilet by moving the hand or forearm into the detection region without touching the toilet, the closed reservoir, or the touchless sensor.

17. A method for flushing a toilet comprising:
   projecting, by a touchless sensor of a touchless actuation system, an electromagnetic field through a closed reservoir of the toilet, thereby defining a detection region external to the closed reservoir, the closed reservoir comprising a bottom and at least one wall extending upward therefrom;
   transmitting, by the touchless sensor, a signal to a processing circuit of the touchless actuation system when an object enters the detection region;
   activating, by the processing circuit, actuation of a motor assembly of the touchless actuation system in response to receiving the signal; and
   rotating, by the motor assembly, a wheel assembly at least one full rotation in response to being actuated;
   wherein rotation of the wheel assembly facilitates flushing of the toilet;
   wherein the touchless sensor, the motor assembly, and the processing circuit are contained in a housing that is coupled to the at least one wall of the closed reservoir such that the touchless sensor is located within the closed reservoir; and
   wherein the wheel assembly is external to the housing.

18. The method of claim 17, wherein the closed reservoir is optically opaque.

19. The method of claim 17, wherein the object is a hand or forearm of a user; and
   wherein the user flushes the toilet by moving the hand or forearm into the detection region without touching the toilet, the closed reservoir for the toilet, or the touchless actuation system.

20. The method of claim 19, further comprising:
   determining, by the processing circuit, a user gesture based on the signal or a plurality of signals;
   comparing, by the processing circuit, the user gesture to a plurality of stored gestures, each of the stored gestures corresponding to an action associated with the touchless actuation system;
   initiating, by the processing circuit, a low volume flush of the toilet in response to determining that the user gesture corresponds to a stored gesture corresponding with a low volume flush; and
   initiating, by the processing circuit, a high volume flush of the toilet in response to determining that the user gesture corresponds to a stored gesture corresponding with a high volume flush.

\* \* \* \* \*